United States Patent
Hong et al.

(10) Patent No.: US 7,566,901 B2
(45) Date of Patent: Jul. 28, 2009

(54) THIN FILM TRANSISTOR PANEL FOR MULTI-DOMAIN LIQUID CRYSTAL DISPLAY

(75) Inventors: Sung-Kyu Hong, Suwon (KR); Young-Chol Yang, Kunpo (KR); Jong-Lae Kim, Seoul (KR); Kyong-Ju Shin, Yongin (KR); Hee-Seob Kim, Kyungki-do (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 98 days.

(21) Appl. No.: 10/527,580

(22) PCT Filed: Nov. 5, 2002

(86) PCT No.: PCT/KR02/02057

§ 371 (c)(1),
(2), (4) Date: Oct. 6, 2005

(87) PCT Pub. No.: WO2004/029709

PCT Pub. Date: Apr. 8, 2004

(65) Prior Publication Data

US 2006/0138414 A1    Jun. 29, 2006

(30) Foreign Application Priority Data

Sep. 27, 2002    (KR) .................. 10-2002-0058994

(51) Int. Cl.
*H01L 29/04* (2006.01)
(52) U.S. Cl. .............. 257/59; 257/72; 349/42; 349/43
(58) Field of Classification Search .......... 257/59, 257/70, 72, E27.131, 79; 349/42, 43, 129
See application file for complete search history.

(56) References Cited

U.S. PATENT DOCUMENTS

| | | | |
|---|---|---|---|
| 5,026,143 A | 6/1991 | Tanaka et al. | |
| 6,028,652 A | 2/2000 | Dohjo et al. | |
| 6,407,791 B1 | 6/2002 | Suzuki et al. | |
| 6,850,301 B2 * | 2/2005 | Shimoshikiryo | 349/129 |
| 6,936,845 B2 * | 8/2005 | Kim et al. | 257/59 |

FOREIGN PATENT DOCUMENTS

| | | |
|---|---|---|
| CN | 1495492 | 5/2004 |
| JP | 55-99762 | 7/1980 |
| JP | 07013164 | 1/1995 |
| JP | 08076125 | 3/1996 |
| JP | 11-352483 | 12/1999 |
| JP | 2001235751 | 8/2001 |
| KR | 1999-0086577 | 12/1999 |
| KR | 1020020000662 | 1/2002 |

* cited by examiner

*Primary Examiner*—Thinh T Nguyen
(74) *Attorney, Agent, or Firm*—F. Chau & Associates, LLC.

(57) ABSTRACT

A thin film transistor array panel is provided, which includes: an insulating substrate; a plurality of first signal lines formed on the insulating substrate; a plurality of second signal lines formed on the insulating substrate and intersecting the first wire in an insulating manner; a pixel electrode formed in a pixel area defined by the intersections of the first signal lines and the second signal lines and including a plurality of sub-areas partitioned by cutouts and a plurality of bridges connecting the subareas; and a direction control electrode formed in the pixel area and including a portion overlapping at least one of the cutouts, wherein two long edges of each subarea are parallel to each other and the at least one of cutouts overlapping the portion of the direction control electrode defines one of two longest edges of the subarea.

14 Claims, 36 Drawing Sheets

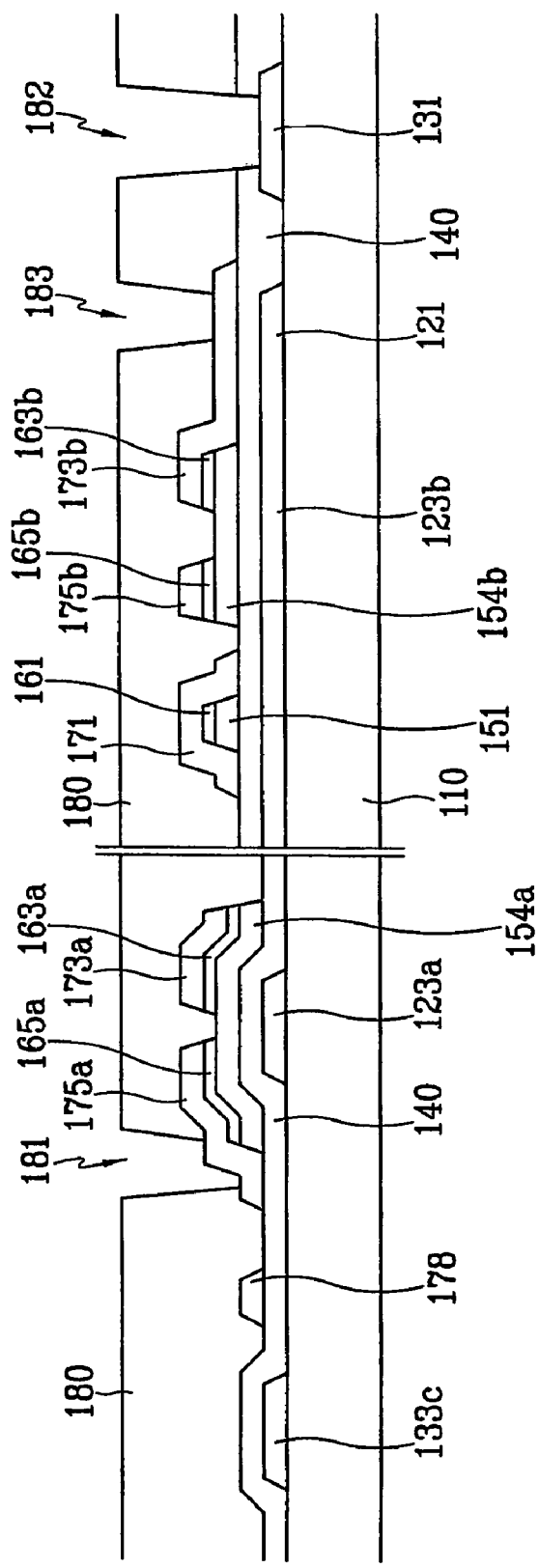

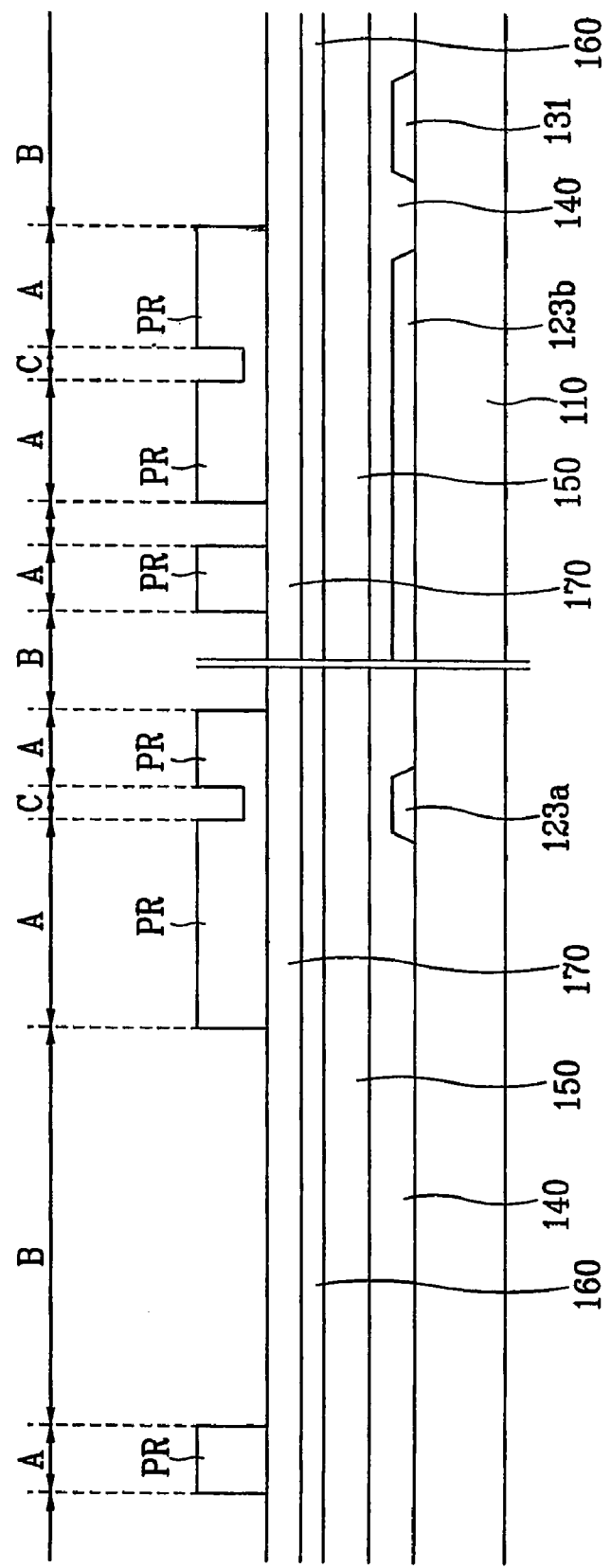

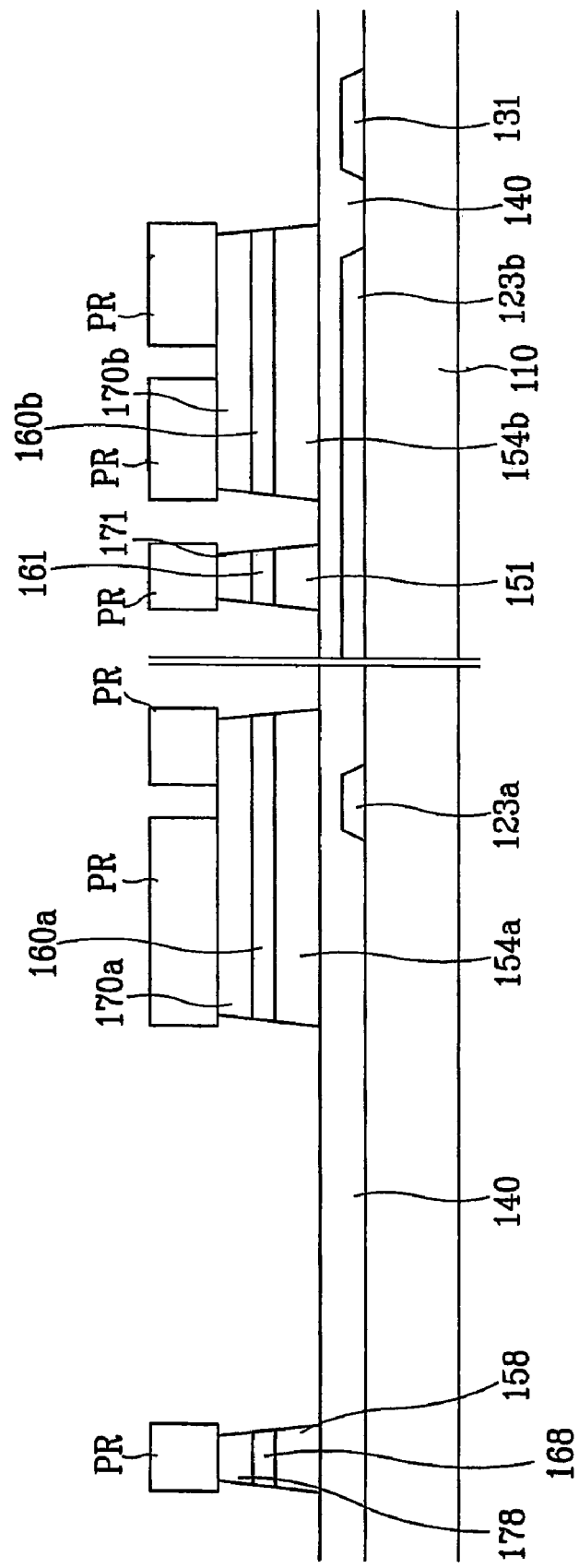

THIN FILM TRANSISTOR PANEL FOR MULTI-DOMAIN LIQUID CRYSTAL DISPLAY

BACKGROUND OF THE INVENTION (a) Field of the Invention

The present invention relates to a liquid crystal display, and in particular, vertically-aligned liquid crystal display having a pixel region including a plurality of domains for wide viewing angle.

(b) Description of the Related Art

A typical liquid crystal display ("LCD") includes an upper panel provided with a common electrode and an array of color filters, a lower panel provided with a plurality of thin film transistors ("TFTs) and a plurality of pixel electrodes, and a liquid crystal layer is interposed therebetween. The pixel electrodes and the common electrode are applied with electric voltages and the voltage difference therebetween causes electric field. The variation of the electric field changes the orientations of liquid crystal molecules in the liquid crystal layer and thus the transmittance of light passing through the liquid crystal layer. As a result, the LCD displays desired images by adjusting the voltage difference between the pixel electrodes and the common electrode.

The LCD has a major disadvantage of its narrow viewing angle, and several techniques for increasing the viewing angle have been developed. Among these techniques, the provision of a plurality of cutouts or a plurality of projections on the pixel electrodes and the common electrode opposite each other along with the vertical alignment of the liquid crystal molecules with respect to the upper and the lower panels is promising.

The cutouts provided both at the pixel electrodes and the common electrode give wide viewing angle by generating fringe field to adjust the tilt directions of the liquid crystal molecules.

The provision of the projections both on the pixel electrode and the common electrode distorts the electric field to adjust the tilt directions of the liquid crystal molecules.

The fringe field for adjusting the tilt directions of the liquid crystal molecules to form a plurality of domains is also obtained by providing the cutouts at the pixel electrodes on the lower panel and the projections on the common electrode on the upper panel.

Among these techniques for widening the viewing angle, the provision of the cutouts has problems that an additional mask for patterning the common electrode is required, an overcoat is required for preventing the effect of the pigments of the color filters on the liquid crystal material, and severe disclination is generated near the edges of the patterned electrode. The provision of the projections also has a problem that the manufacturing method is complicated since it is required an additional process step for forming the projections or a modification of a process step. Moreover, the aperture ratio is reduced due to the projections and the cutouts.

SUMMARY OF THE INVENTION

It is a motivation of the present invention to provide a liquid crystal display capable of being manufactured by a simplified processes and forming stable multi-domains.

It is another motivation of the present invention to optimize arrangements of cutouts and a direction control electrode for obtaining stable multi-domains.

A thin film transistor array panel is provided, which includes: an insulating substrate; a plurality of first signal lines formed on the insulating substrate; a plurality of second signal lines formed on the insulating substrate and intersecting the first wire in an insulating manner; a pixel electrode formed in a pixel area defined by the intersections of the first signal lines and the second signal lines and including a plurality of subareas partitioned by cutouts and a plurality of bridges connecting the subareas; and a direction control electrode formed in the pixel area and including a portion overlapping at least one of the cutouts, wherein two long edges of each subarea are parallel to each other and the at least one of cutouts overlapping the portion of the direction control electrode defines one of two longest edges of the subarea.

Preferably, the thin film transistor array panel further includes a third signal line intersecting the second signal lines in an insulating manner and including a portion overlapping at least another of the cutouts which is not overlapping the direction control electrode. The third signal line may include a pair of portions placed between adjacent two of the first signal lines and having inversion symmetry, and the pair of portions of the third signal line placed between the adjacent two of the first signal lines may be connected to each other through a connector.

Preferably, the thin film transistor array panel further includes: a first thin film transistor connected to a relevant one of the first signal lines, a relevant one of the second signal lines, and the pixel electrode; a second thin film transistor connected to a previous one of the first signal lines, a previous one of the second signal lines, and the direction control electrode; and a third thin film transistor connected to the previous first signal line, the relevant second signal line, and the pixel electrode.

It is preferable that at least one of the bridges are located near a center of the long edges of the subareas and the other of the bridges are located at an edge of the pixel electrode positioned dose to the second signal lines. The bridges are preferably located at an edge of the pixel electrode positioned close to the second signal lines. At least one of the subareas is preferably chamfered.

The cutouts preferably include a transverse cutout bisecting the pixel electrode into upper and lower halves and a plurality of oblique cutouts having inversion symmetry with respect to the transverse cutout.

The oblique cutouts may include: a first cutout proceeding from an edge of the pixel electrode toward another edge of the pixel electrode to define one of the bridges located between a terminal of the first cutout and the another edge of the pixel electrode; a second cutout proceeding from an edge of the pixel electrode into the pixel electrode; a third cutout proceeding from the transverse cutout into the pixel electrode, the second and the third cutouts running in a straight line to define one of the bridges located between the second cutout and the third cutout; and a pair of fourth cutouts proceeding from edges of the pixel electrode into the pixel electrode and extending along a straight line to define one of the bridges located between the fourth cutouts.

Alternatively, the oblique cutouts include: a first cutout proceeding from an edge of the pixel electrode toward another edge of the pixel electrode to define one of the bridges located between a terminal of the first cutout and the another edge of the pixel electrode; and a second cutout curved to define both a long edge and a short edge of one of the subareas.

Alternatively, the oblique cutouts include: a first cutout proceeding from an edge of the pixel electrode toward another edge of the pixel electrode to define one of the bridges located between a terminal of the first cutout and the another edge of the pixel electrode; a second cutout proceeding from an edge of the pixel electrode toward the transverse cutout to define one of the bridges located between the transverse cutout and a terminal of the second cutout; and a pair of third cutouts proceeding from edges of the pixel electrode into the pixel electrode and extending along a straight line to define one of the bridges located between the fourth cutouts. The second and the third cutouts may have inlets wider than the terminals of the second and the third cutouts.

Alternatively, the oblique cutouts include: a first cutout proceeding from an edge of the pixel electrode toward another edge of the pixel electrode to define one of the bridges located between a terminal of the first cutout and the another edge of the pixel electrode; a second cutout proceeding from an edge of the pixel electrode toward the transverse cutout to define one of the bridges located between the transverse cutout and a terminal of the second cutout; and a third cutout curved to define both a long edge and a short edge of one of the subareas.

BRIEF DESCRIPTION OF THE DRAWINGS

FIGS. 3A to 3D are sectional views of a TFT array panel for an LCD sequentially illustrating a manufacturing method thereof according to a first embodiment of the present invention;

FIGS. 6A to 11B are layout views and sectional views of a TFT array panel for an LCD sequentially illustrating a manufacturing method thereof according to a second embodiment of the present invention;

DETAILED DESCRIPTION OF PREFERRED EMBODIMENTS

Figure 1:
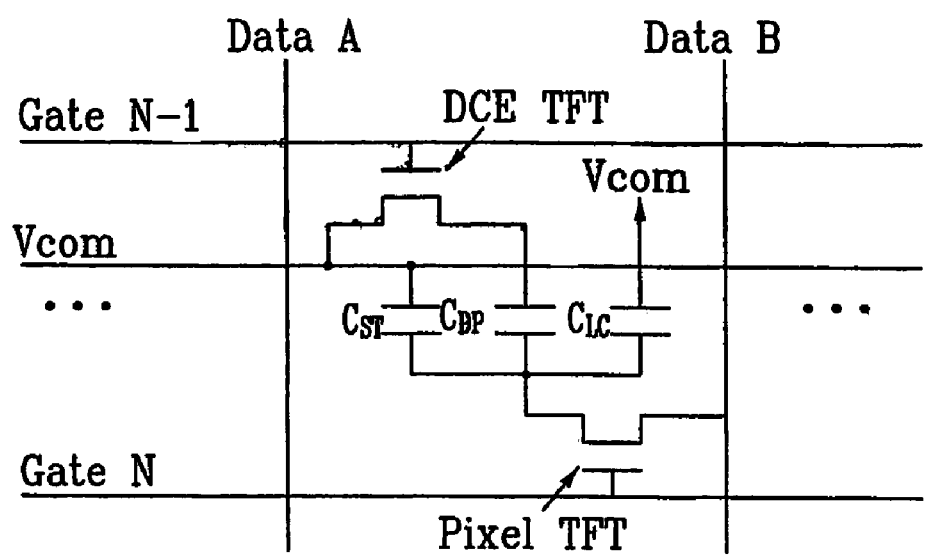
FIG. 1 is an equivalent circuit diagram of an LCD according to an embodiment of the present invention.

The present invention now will be described more fully hereinafter with reference to the accompanying drawings, in which preferred embodiments of the inventions invention are shown. The present invention may, however, be embodied in many different forms and should not be construed as limited to the embodiments set forth herein.

In the drawings, the thickness of layers and regions are exaggerated for clarity. Like numerals refer to like elements throughout. It will be understood that when an element such as a layer, region or substrate is referred to as being "on" another element, it can be directly on the other element or intervening elements may also be present. In contrast, when an element is referred to as being "directly on" another element, there are no intervening elements present.

A multi-domain liquid crystal display according to embodiments of this invention will be described in detail with reference to the accompanying drawings.

FIG. 1 is an equivalent circuit diagram of an LCD according to an embodiment of the present invention.

An LCD according to an embodiment of the present invention includes a TFT array panel, a color filter array panel opposite the TFT array panel, and a liquid crystal layer interposed therebetween. The TFT array panel is provided with a plurality of gate lines and a plurality of data lines intersecting each other to define a plurality of pixel areas, and a plurality of storage electrode lines extending parallel to the gate lines. The gate lines transmit scanning signals and the data lines transmit image signals. A common voltage Vcom is applied to the storage electrode lines. Each pixel area is provided with a pixel TFT for a pixel electrode and a direction-control-electrode TFT DCETFT for a direction control electrode ("DCE"). The pixel TFT includes a gate electrode connected to one of the gate lines, a source electrode connected to one of the data lines, and a drain electrode connected to one of a plurality of pixel electrodes, while the DCE TFT includes a gate electrode connected to a previous gate line, a source electrode connected to one of the storage electrode lines, and a drain electrode connected to one of a plurality of direction control electrodes.

The DCE and the pixel electrode are capacitively coupled, and the capacitor therebetween or its capacitance is represented by $C_{DP}$. The pixel electrode and a common electrode provided on the color filter array panel form a liquid crystal capacitor, and the liquid crystal capacitor or its capacitance is represented by $C_{LC}$. The pixel electrode and a storage electrode connected to one of the storage electrode lines form a storage capacitor, and the storage capacitor or its capacitance is represented by $C_{ST}$.

Although it is not shown in the circuit diagram, the pixel electrode according to an embodiment of the present invention has an aperture overlapping the DCE such that the electric field due to the DCE flows out through the aperture. The electric field flowing out through the aperture makes the liquid crystal molecules have pretilt angles. The pretilted liquid crystal molecules are rapidly aligned without dispersion along predetermined directions upon the application of the electric field due to the pixel electrode.

In order to obtain the pretilted liquid crystal molecules using the electric field generated by the DCE, the potential of the DCE relative to the potential of the common electrode (referred to as the "DCE voltage" hereinafter) is larger than the potential of the pixel electrode relative to the potential of the common electrode (referred to as the "pixel voltage" hereinafter) by a predetermined value. The LCD according to an embodiment of the present invention easily satisfies this requirement by isolating the DCE after applying the potential applied to the storage electrode lines to the DCE. The reason will be described now.

Consider a moment that a given pixel electrode having a negative potential is refreshed by a positive potential. The application of a gate-on signal to the previous gate line turns on the DCE TFT to make the DCE have a potential higher than the pixel electrode. This changes the potential of the pixel electrode capacitively coupled with the DCE. In this case, the capacitor $C_{DP}$ between the DCE and the pixel electrode and the capacitor $C_{LC}$ between the pixel electrode and the common electrode are connected in series. Since the pixel electrode had the negative potential, its potential is lower than that of the DCE, i.e., $V_{DCE} > V_P$ during the charging of the serially-connected capacitors $C_{DP}$ and $C_{LC}$. When the DCE TFT is turned off after charging, the DCE floats. Accordingly, the potential of the DCE is always larger than the potential of the pixel electrode irrespective of the potential change of the pixel electrode. For example, when the potential of the pixel electrode is increased to a positive value when the pixel TFT is turned on, the potential of the DCE follows the potential increase of the pixel electrode in order to maintain the potential difference between the DCE and the pixel electrode.

This is described in terms of an electrical circuit.

A voltage across a capacitor in an electrical circuit is given by $$V_C = V_0 + \frac{1}{C} \int_0^t i \, d(t) \quad (1)$$

A floating electrode is equivalent to an electrode connected to a resistor having infinite resistance (R=∞). Therefore, i=0 and $V_C = V_0$, that is, the initial voltage across the capacitor is maintained. In other words, the potential of a floating electrode increases or decreases coupled with the potential of the other electrode.

On the contrary, when refreshing with a negative potential, the potential of the DCE is always lower than the potential of the pixel electrode by a predetermined value.

According to an embodiment of the present invention, the DCE TFT is connected to the storage electrode lines such that the common voltage is applied to the DCE. Hence, the potentials of the two electrodes increases or decreases to have substantially the same polarity irrespective of the polarity of the potential applied to the pixel electrode in the next frame. As a result, the present invention is applied any inversion type such as line inversion and dot inversion.

For the same gray, there is no variation of the potential difference between the DCE and the pixel electrode irrespective of the grays of previous and next frames, thereby ensuring stability of image quality.

The disconnection of the DCE TFTs from the data lines prevents the increase of the load of the data lines.

Now, a detailed embodiment of the present invention is described with reference to FIGS. 2A to 2C.

Figure 2A:
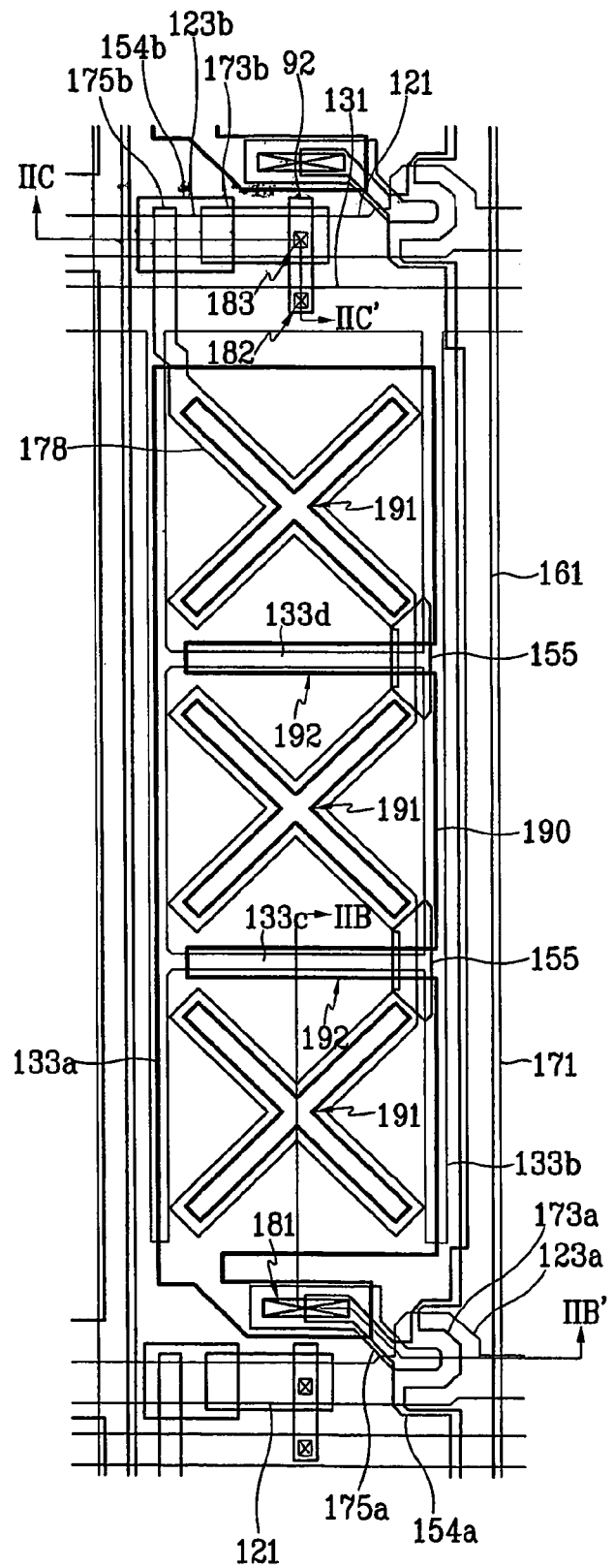
FIG. 2A is a layout view of a TFT array panel for an LCD according to a first embodiment of the present invention.
Figure 2B:
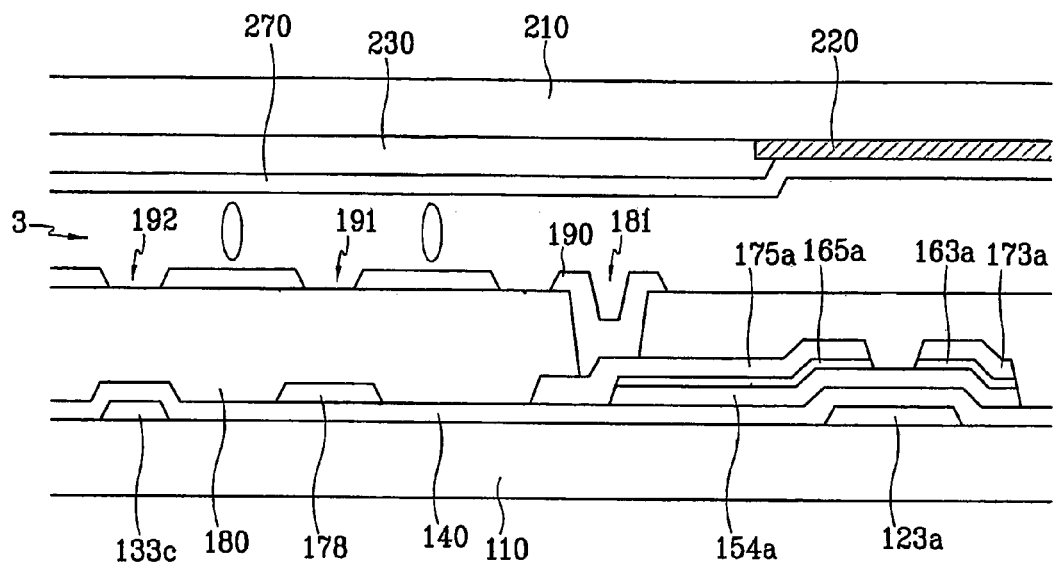
FIGS. 2B and 2C are sectional views of the TFT array panel shown in FIG. 2A taken along the lines IIB-IIB' and IIC-IIC', respectively.
Figure 2C:
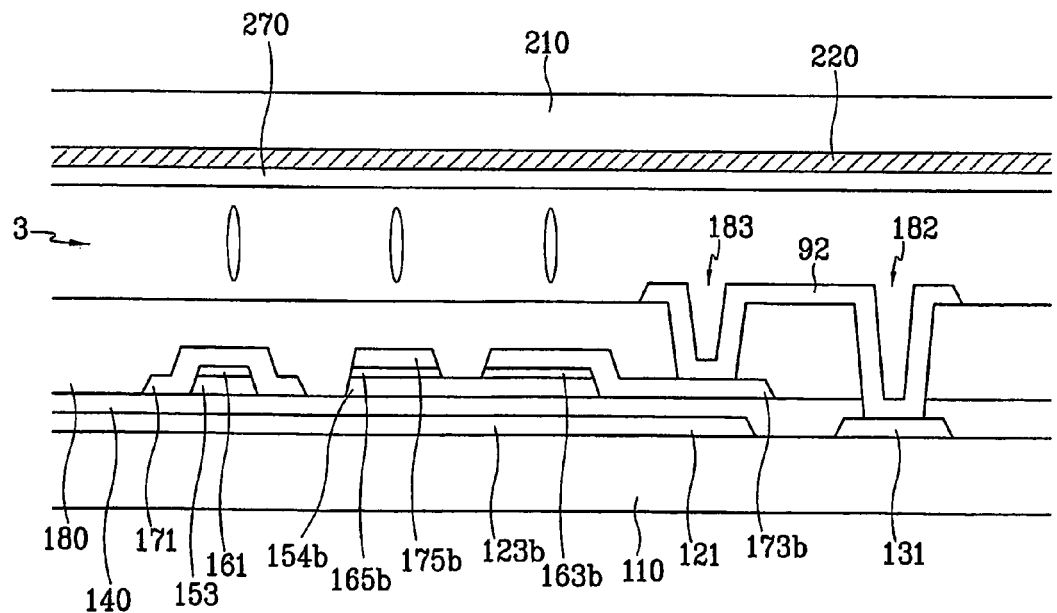

FIG. 2A is a layout view of an LCD according to an embodiment of the present invention, and FIGS. 2B and 2C are sectional views of the LCD shown in FIG. 2A taken along the lines IIB-IIB'.

An LCD according to a first embodiment of the present invention includes a lower panel, an upper panel facing the lower panel, and a vertically (or homeotropically) aligned liquid crystal layer interposed between the lower panel and the upper panel.

The lower panel will now be described more in detail.

A plurality of gate lines 121 are formed on an insulating substrate 110 and a plurality of data lines 171 are formed thereon. The gate lines 121 and the data lines 171 are insulated from each other and intersect each other to define a plurality of pixel areas.

Each pixel area is provided with a pixel TFT, a DCE TFT, a DCE and a pixel electrode. The pixel TFT has three terminals, a first gate electrode 123a, a first source electrode 173a and a first drain electrode 175a while the DCE TFT has three terminals, a second gate electrode 123b, a second source electrode 173b and a second drain electrode 175b. The pixel TFT is provided for switching the signals transmitted to the pixel electrode 190 while the DCE TFT is provided for switching the signals entering the DCE 178. The gate electrode 123a, the source electrode 173a and the drain electrode 175 of the pixel TFT are connected to corresponding one of the gate lines 121, one of the data lines 171 and the pixel electrode 190, respectively. The gate electrode 123b, the source electrode 173b and the drain electrode 175b of the DCE TFT are connected to previous one of the gate lines 121, corresponding one of the storage electrode lines 131 and the DCE 178, respectively. The DCE 178 is applied with a direction-controlling voltage for controlling the pre-tilts of the liquid crystal molecules to generate a direction-controlling electric field between the DCE 178 and the common electrode 270. The DCE 178 is formed in a step for forming the data lines 171.

The layered structure of the lower panel will be described in detail.

A plurality of gate lines 121 extending substantially in a transverse direction are formed on an insulating substrate 110, and a plurality of first and second gate electrodes 123a and 123b are connected to the gate lines 121. A plurality of storage electrode lines 131 and a plurality of sets of first to fourth storage electrodes 133a-133d are also formed on the insulating substrate 110. The storage electrode lines 131 extend substantially in the transverse direction, and the first and the second storage electrodes 133a and 133b extend from the storage electrode line 131 in a longitudinal direction. The third and the fourth storage electrodes 133c and 133d extend in the transverse direction and connect the first storage electrode 133a and the second storage electrode 133b.

The gate wire 121, 123a and 123b and the storage electrode wire 131 and 133a-133d are preferably made of Al, Cr or their alloys, Mo or Mo alloy. If necessary, the gate wire 121, 123a and 123b and the storage electrode wire 131 and 133a-133d include a first layer preferably made of Cr or Mo alloys having excellent physical and chemical characteristics and a second layer preferably made of Al or Ag alloys having low resistivity.

A gate insulating layer 140 is formed on the gate wire 121, 123a and 123b and the storage electrode wire 131 and 133a-133d.

A semiconductor layer 151, 154a, 154b and 155 preferably made of amorphous silicon is formed on the gate insulating layer 140. The semiconductor layer 151, 154a, 154b and 155 includes a plurality of first and second channel semiconductors 154a and 154b forming channels of TFTs, a plurality of data-line semiconductors 151 located under the data lines 171, and a plurality of intersection semiconductors 155 located near the intersections of DCEs 178 and the storage electrodes 133c and 133d for ensuring insulation therebetween.

An ohmic contact layer 161, 163a, 163b, 165a and 165b preferably made of silicide or n+ hydrogenated amorphous silicon heavily doped with n type impurity is formed on the semiconductor layer 151, 154a, 154b and 155.

A data wire 171, 173a, 173b, 175a and 175b is formed on the ohmic contact layer 161, 163a, 163b, 165a and 165b and the gate insulating layer 140. The data wire 171, 173a, 173b, 175a and 175b includes a plurality of data lines 171 extending in the longitudinal direction and intersecting the gate lines 121 to form a plurality of pixels, a plurality of first source electrodes 173a branched from the data lines 171 and extending onto portions 163a of the ohmic contact layer, a plurality of first drain electrodes 175a disposed on portions 165a of the ohmic contact layer, located opposite the first source electrodes 173a with respect to the first gate electrodes 123a and separated from the first source electrodes 173a, a plurality of second source electrodes 173b and a plurality of second drain electrodes 175b disposed on respective portions 163b and 165b opposite each other with respect to the second gate electrodes 123b, and a plurality of data pads (not shown) connected to one ends of the data lines 171 to receive image signals from an external device.

A plurality of DCEs 178 are formed in the pixel areas defined by the intersections of the gate lines 121 and the data lines 171. Each DCE 178 includes a plurality of X-shaped metal pieces connected to one another and is connected to the second drain electrode 175b. The data wire 171, 173a, 173b, 175a and 175b and the DCEs 178 are preferably made of Al, Cr or their alloys, Mo or Mo alloy. If necessary, the data wire 171, 173a, 173b, 175a and 175b and the DCEs 178 include a first layer preferably made of Cr or Mo alloys having excellent physical and chemical characteristics and a second layer preferably made of Al or Ag alloys having low resistivity.

A passivation layer 180 preferably made of silicon nitride or organic insulator is formed on the data wire 171, 173a, 173b, 175a and 175b.

The passivation layer 180 is provided with a plurality of contact holes 181 exposing the first drain electrodes 175a, a plurality of contact holes 182 extending to the gate insulating layer 140 and exposing the storage electrode lines 131, a plurality of contact holes 183 exposing the second source electrodes 173b, a plurality of contact holes (not shown) exposing the data pads, and a plurality of contact holes (not shown) extending to the gate insulating layer 140 exposing the gate pads. The contact holes exposing the pads may have various shapes such as polygon or circle. The area of the contact hole is preferably equal to or larger than 0.5 mm×15 μm and not larger than 2 mm×60 μm.

A plurality of pixel electrodes 190 are formed on the passivation layer 180. Each pixel electrode 190 is connected to the first drain electrode 175a through the contact hole 181 and has a plurality of X-shaped cutouts 191 and a plurality of linear cutouts 192. The X-shaped cutouts 191 overlap the X-shaped portions of the DCE 178 while the linear cutouts 192 overlap the third and the fourth storage electrodes 133c and 133d. The DCE 178 broadly overlaps peripheries of the cutouts 191 as well as the cutouts 191 themselves to form a storage capacitance along with the pixel electrode 190.

A plurality of bridges 92 connecting the storage electrode lines 131 and the second source electrodes 173b through the contact holes 182 and 183 are also formed on the passivation layer. Furthermore, a plurality of subsidiary gate pads (not shown) and a plurality of subsidiary data pads (not shown) are formed on the passivation layer 180. The subsidiary gate pads and the subsidiary data pads are connected to the gate pads and the data pads through the contact holes. The pixel electrodes 190, the bridges 92, the subsidiary gate pads and the subsidiary data pads are preferably formed of indium zinc oxide ("IZO"). Alternatively, the pixel electrodes 190, the bridges 92 and the subsidiary pads are preferably made of indium tin oxide ("ITO").

To summarize, each pixel electrode 190 has the plurality of cutouts 191 and 192 for partitioning a pixel region into a plurality of domains, and the first cutouts 191 overlap the DCE 178 while the second cutouts 192 overlap the storage electrodes 133c and 133d. The DCE 178 and the first cutouts 191 are aligned such that the DCE 178 is exposed through the first cutouts 191 to be seen in front view. The storage electrode line 131 and the DCE 178 are connected via the DCE TFT while the data line 171 and the pixel electrode 190 are connected via the pixel TFT, and the pixel electrode 190 and the DCE 178 are aligned to form a storage capacitance.

According to another embodiment of the present invention, the DCEs 178 include substantially the same layer as the gate wire 121, 123a and 123b. The portions of the passivation layer 180 on the DCEs 178 may be removed to form a plurality of openings.

The upper substrate 210 will no be described in detail.

A black matrix 220 for preventing light leakage, a plurality of red, green and blue color filters 230, and a common electrode 270 preferably made of a transparent conductor such as ITO or IZO are formed on an upper substrate 210 preferably made of transparent insulating material such glass.

A plurality of liquid crystal molecules contained in the liquid crystal layer 3 is aligned such that their director is perpendicular to the lower and the upper substrates 110 and 210 in absence of electric field. The liquid crystal layer 3 has negative dielectric anisotropy.

The lower substrate 110 and the upper substrate 210 are aligned such that the pixel electrodes 190 exactly match and overlap the color filters 230. In this way, a pixel region is divided into a plurality of domains by the cutouts 191 and 192. The alignment of the liquid crystal layer 3 in each domain is stabilized by the DCE 178.

This embodiment illustrates the liquid crystal layer 3 having negative dielectric anisotropy and homeotropic alignment with respect to the substrates 110 and 210. However, the liquid crystal layer 3 may have positive dielectric anisotropy and homogeneous alignment with respect to the substrates 110 and 210.

A method of manufacturing a TFT array panel of an LCD having the above-described structure will be described.

FIGS. 3A to 3D are sectional views of a TFT array panel for an LCD sequentially illustrating a manufacturing method thereof according to a first embodiment of the present invention.

Figure 3A:
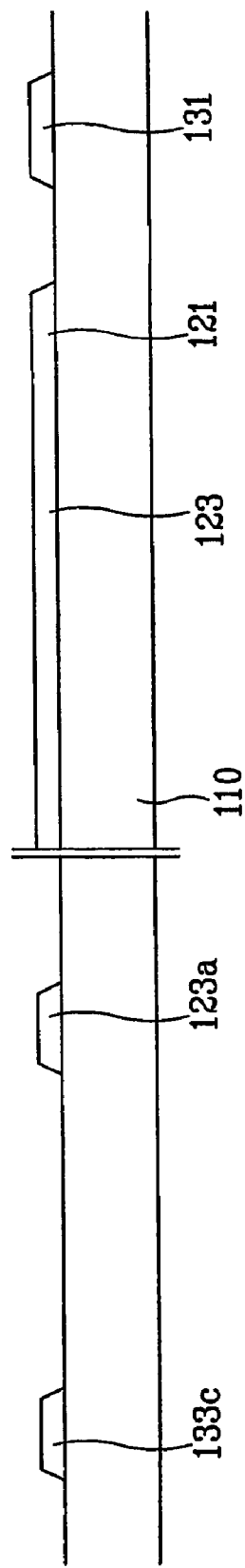

First, as shown in FIG. 3A, a conductive layer preferably made of metal is deposited by sputtering and either dry-etched or wet-etched by a first photo-etching step using a mask to form a gate wire and a storage electrode wire on a substrate 110. The gate wire includes a plurality of gate lines 121, a plurality of gate pads (not shown) and a plurality of gate electrodes 123, and the storage wire includes a plurality of storage electrode lines 131 and a plurality of storage electrodes 133a-133d.

Figure 3B:
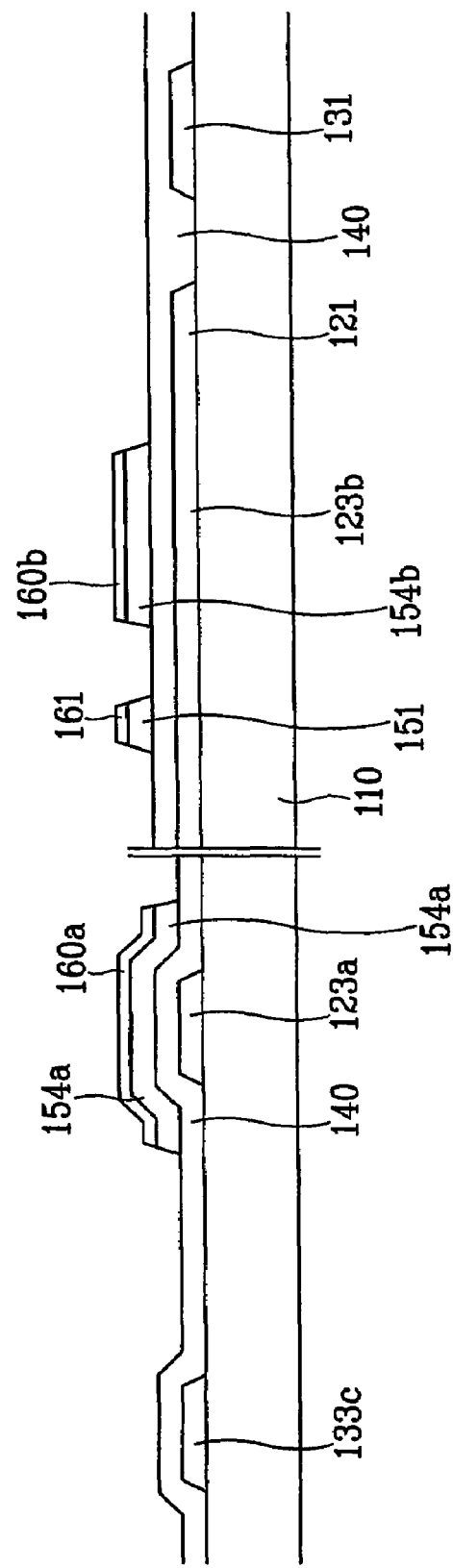

As shown in FIG. 3B, a gate insulating layer 140 with 1,500-5,000 Å thickness, a hydrogenated amorphous silicon layer with 500-2,000 Å thickness, and a doped amorphous silicon layer with 300-600 Å thickness are sequentially deposited by chemical vapor deposition ("CVD"). The doped amorphous silicon layer and the amorphous silicon layer are patterned by a photo-etching step using a mask to form an ohmic contact layer 160a, 160b and 161 and an amorphous silicon layer 151, 154a and 154b.

Figure 3C:
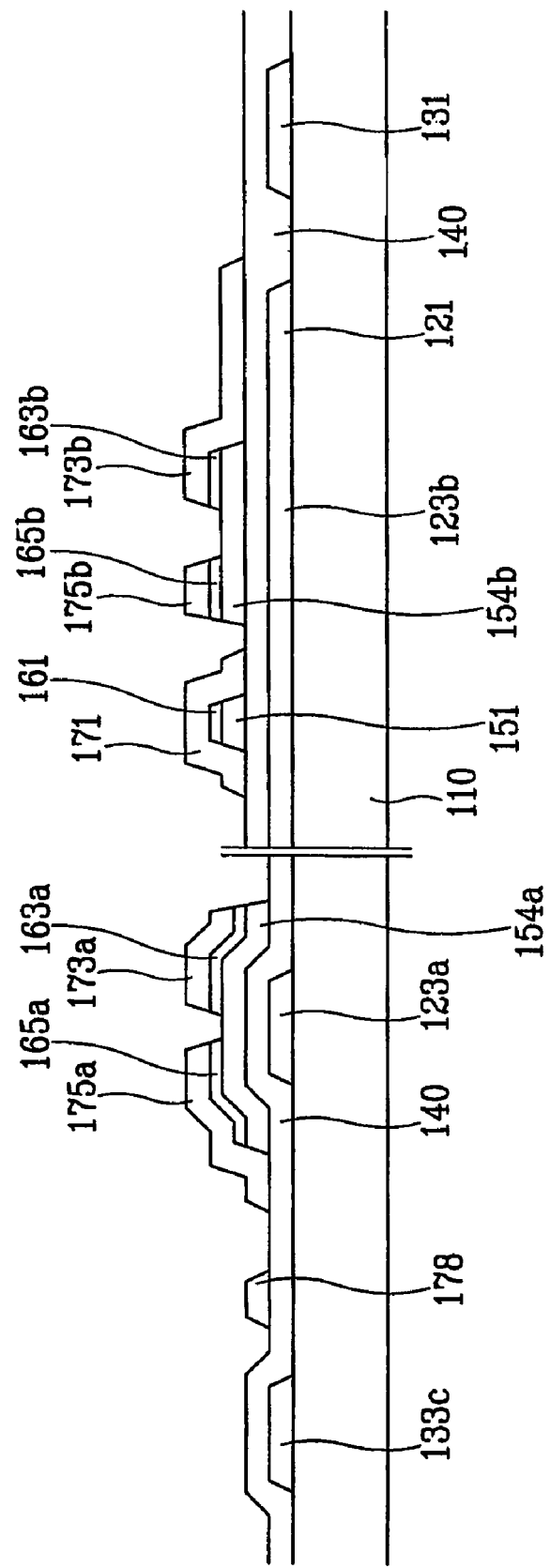

Thereafter, as shown in FIG. 3C, a conductive layer with 1,500-3,000 Å thickness preferably made of metal is deposited by sputtering and patterned by a photo-etching step using a mask to form a data wire and a plurality of DCEs 178. The data wire includes a plurality of data lines 171, a plurality of source electrodes 173a and 173b, a plurality of drain electrodes 175a and 175b, and a plurality of data pads (not shown).

Then, portions of the ohmic contact layer 160a and 160b, which are not covered by the source electrodes 173a and 173b and the drain electrodes 175a and 175b, are removed such that an ohmic contact layer 163a, 163b, 165a and 165b including a plurality of separated portions is formed and portions of the semiconductor layer 151 between the source electrodes 173a and 173b and the drain electrodes 175a and 175b are exposed.

As shown in FIG. 3D, a passivation layer 180 is formed by coating an organic insulating material having low dielectric constant and good planarization characteristic or by CVD of low dielectric insulating material such as SiOF or SiOC having a dielectric constant equal to or less than 4.0. The passivation layer 180 together with the gate insulating layer 140 is patterned by a photo-etching step using a mask to form a plurality of contact holes 181, 182 and 183.

Finally, as shown in FIG. 2A, an ITO layer or an IZO layer with thickness of 1500-500 Å is deposited and photo-etched using a mask to form a plurality of pixel electrodes 190, a plurality of connecting bridges 92, a plurality of subsidiary gate pads (not shown) and a plurality of subsidiary data pads (not shown).

This technique is applied to a manufacturing method using five masks as described above. However, the technique may be well adapted for a method of a TFT array panel for an LCD using four masks. It is described in detail with reference to the drawings.

Figure 4:
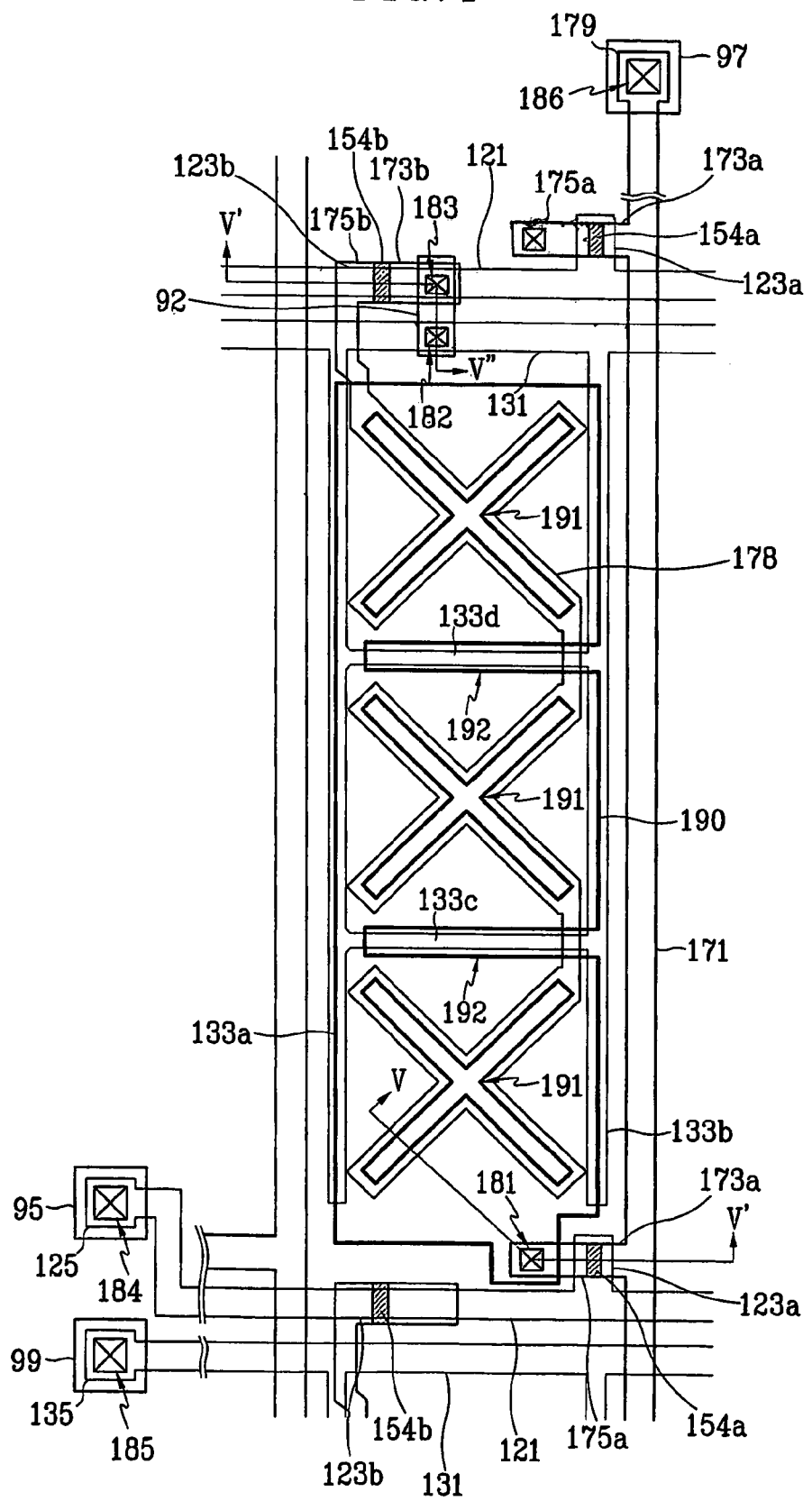
FIG. 4 is a layout view of a TFT array panel for an LCD according to a second embodiment of the present invention.
Figure 5:
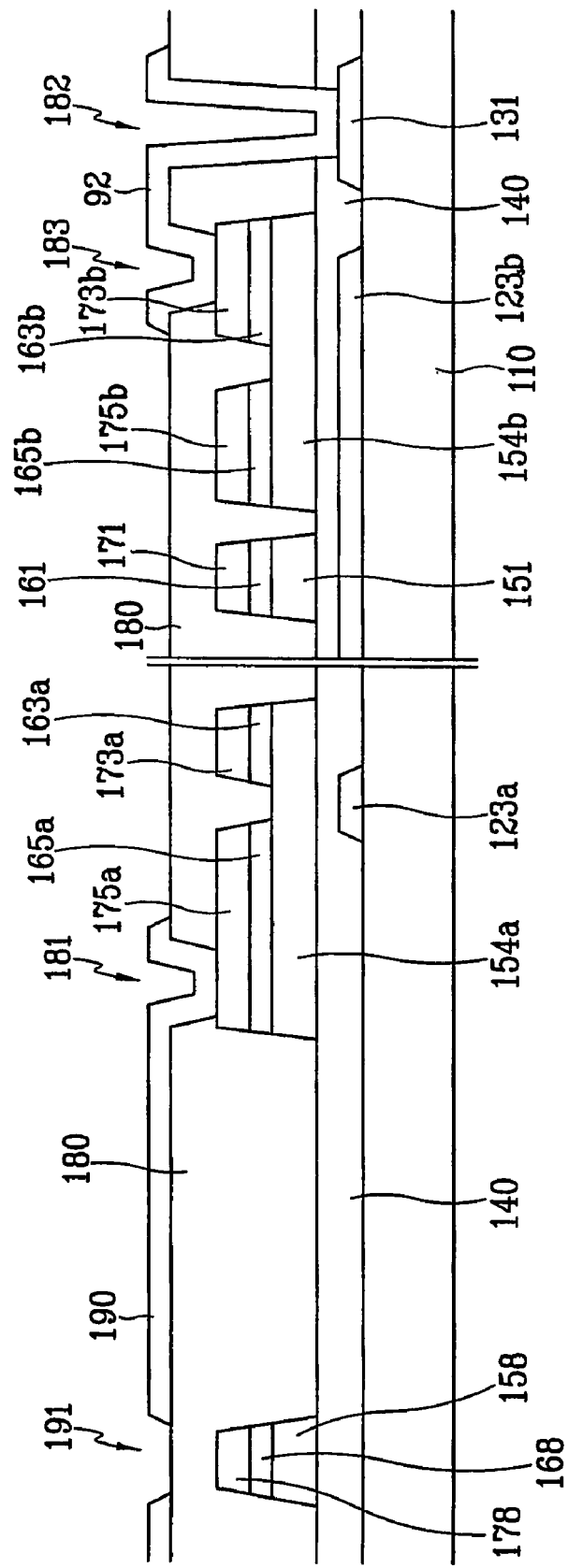
FIG. 5 is a sectional view of the TFT array panel shown in FIG. 4 taken along the lines V-V' and V'-V"

FIG. 4 is a layout view of a TFT array panel for an LCD according to a second embodiment of the present invention, and FIG. 5 is a sectional view of the TFT array panel shown FIG. 4 taken along the lines V-V' and V'-V".

A TFT array panel for an LCD according to a second embodiment of the present invention is manufactured by using four masks and has a feature compared with a TFT array panel manufactured by using five masks, which will be described now.

An ohmic contact layer 161, 163a, 163b, 165a and 165b formed under a plurality of DCEs 178 and a data wire including a plurality of data lines 171, a plurality of source electrodes 173a and 173b, a plurality of the drain electrodes 175a and 175b and a plurality of data pads 179 has substantially the same shape as the data wire 171, 173a, 173b, 175a, 175b and 179 and the DCEs 178. An amorphous silicon layer 151, 154a, 154b and 158 has substantially the same shape as the data wire and the DCEs 178 except that channel portions between the source electrodes 173a and 173b and the drain electrodes 175a and 175b are connected. Remaining structure is substantially the same as a TFT array panel manufactured by a five-mask process.

FIG. 4 illustrates a gate pad 125, a storage pad 135 and a data pad 179 as well as a subsidiary gate pad 95, a subsidiary storage pad 99 and a subsidiary data pad 97.

A method of manufacturing a TFT array panel will be now described.

FIGS. 6A to 11B are layout views and sectional views of a TFT array panel for an LCD sequentially illustrating a manufacturing method thereof.

Figure 6A:
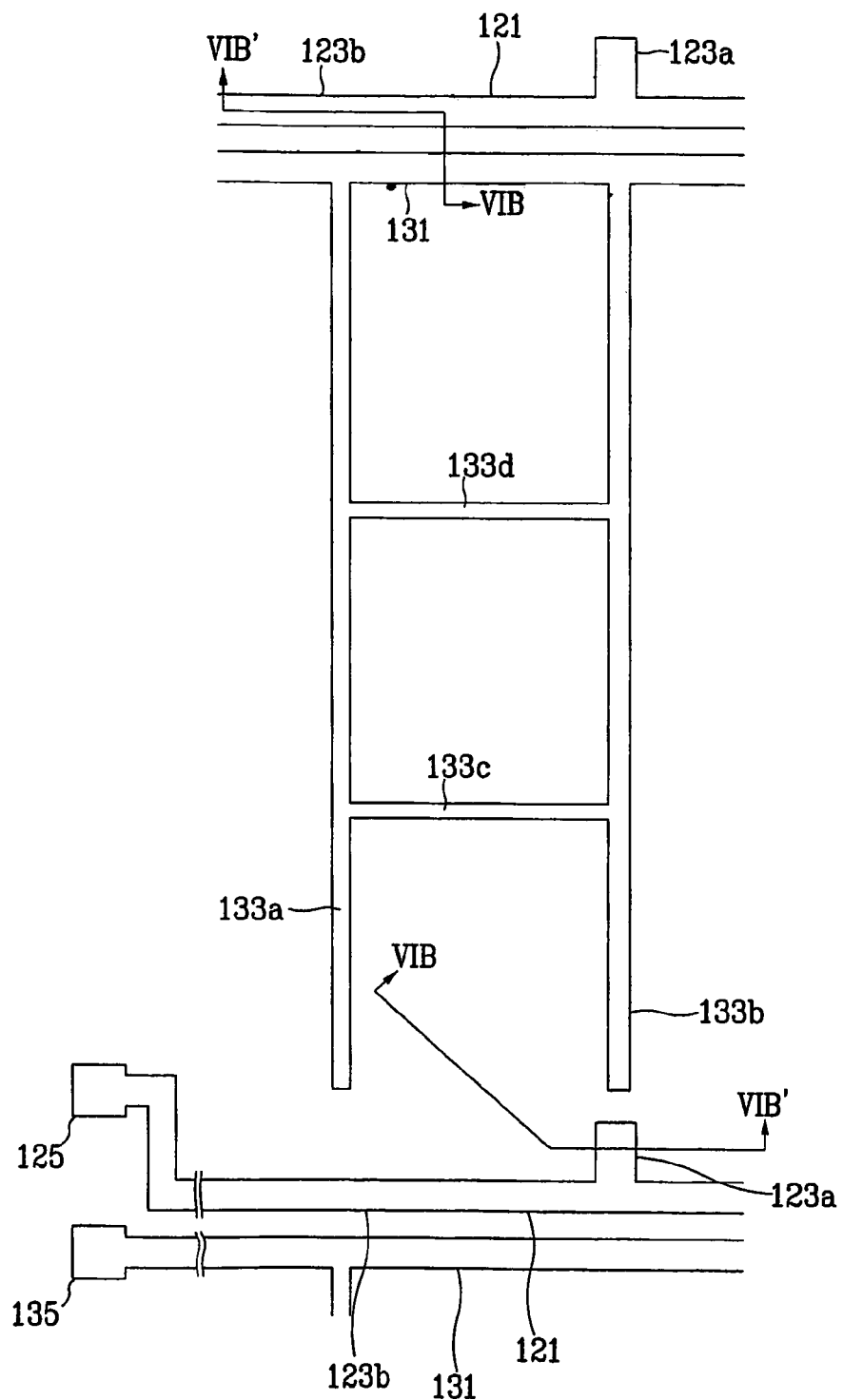
Figure 6B:
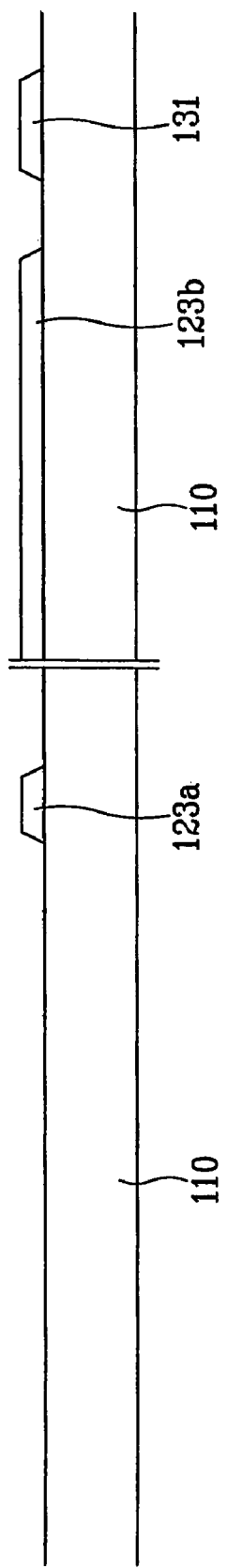

First, as shown in FIGS. 6A and 6B, Al, Ag, their alloys or the like is deposited and photo-etched to form a gate wire including a plurality of gate lines 121, a plurality of gate pads 125 and a plurality of gate electrodes 123, and a storage electrode wire 131 and 133a-133d. (First Mask)

Figure 7:
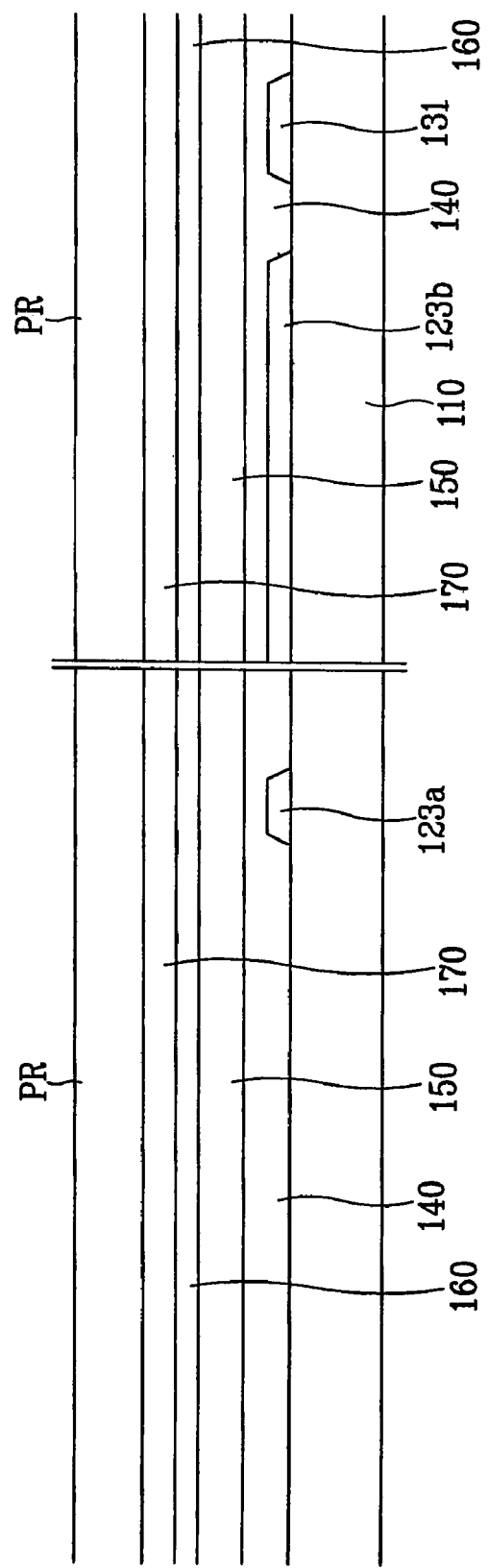

As shown in FIG. 7, a silicon nitride gate insulating layer 140 with 1,500-5,000 Å thickness, an amorphous silicon layer 150 with 500-2,000 Å thickness, and a contact layer 160 with 300-600 Å thickness are sequentially deposited by CVD. A conductive layer 170 preferably made of Al, Ag or their alloys is deposited by preferably sputtering, and a photoresist film PR with thickness of 1-2 microns is coated thereon.

Figure 8A:
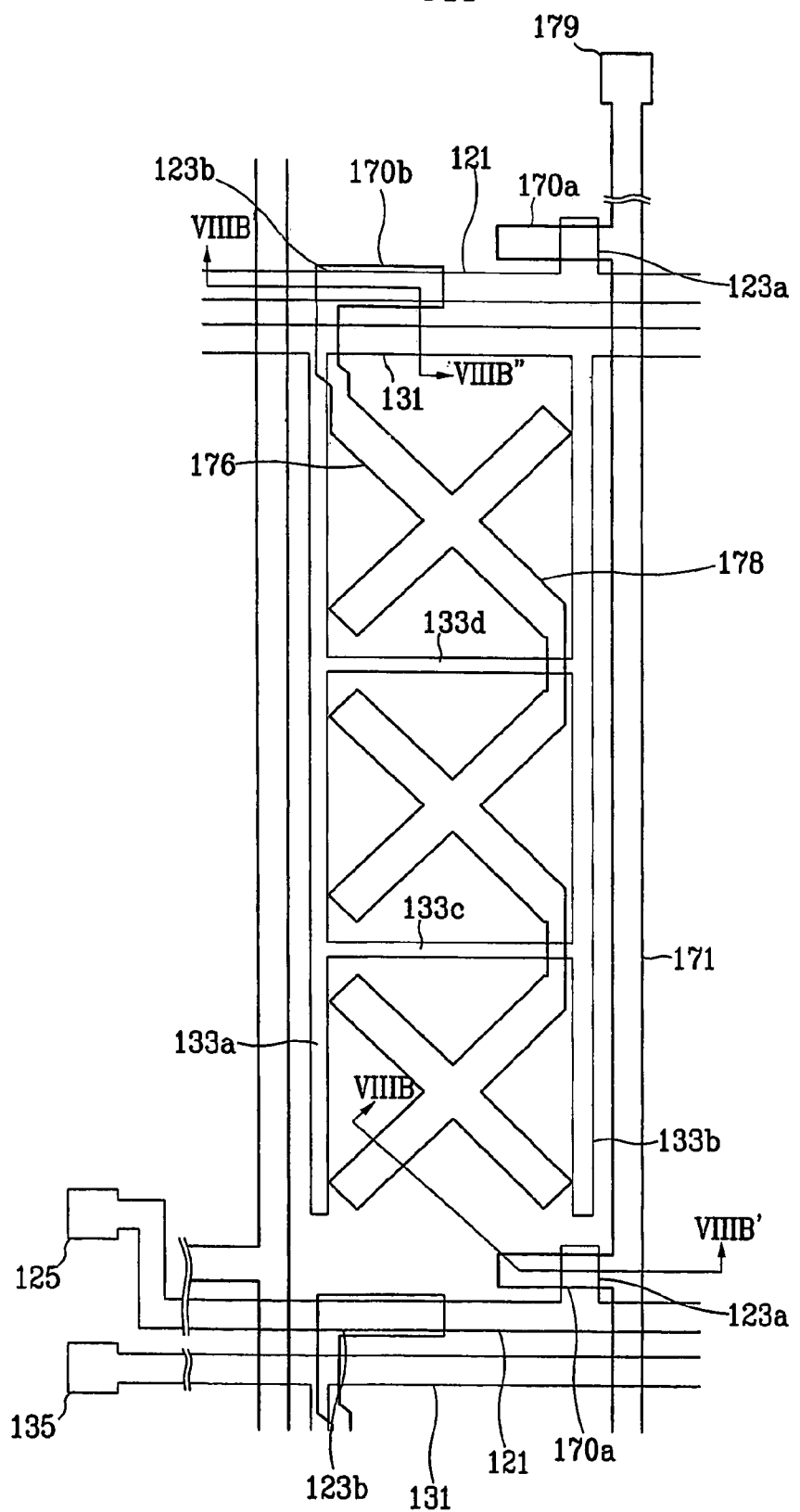

Thereafter, the photoresist film PR is exposed to light through a mask and is developed to form a photoresist pattern PR as shown in FIGS. 8A and 8B. Each portion of the photoresist pattern PR located on a channel area C of a TFT, which is placed between a source electrode 173a or 173b and a drain electrode 175a or 175b, is thicker than each portion of the photoresist pattern PR located on a data area A where a data wire will be formed. All portions of the photoresist film PR on the remaining areas B are removed. Here, the ratio of the thickness of the photoresist pattern PR on the channel area C and on the data area A is adjusted depending on process conditions of subsequent etching steps described later, and it is preferable that the thickness of the former is equal to or less than a half of that of the latter, for example, equal to or less than 4,000 Å. (Second Mask)

The position-dependent thickness of the photoresist pattern is obtained by several techniques. A slit pattern, a lattice pattern or a translucent film is provided on the mask in order to adjust the light transmittance in the area C.

When using a slit pattern, it is preferable that width of the slits and a gap between the slits is smaller than the resolution of an exposer used for the photolithography. In case of using a translucent film, thin films with different transmittances or different thickness may be used to adjust the transmittance on the masks.

When a photoresist film is exposed to light through such a mask, polymers of a portion directly exposed to the light are almost completely decomposed, and those of a portion exposed to the light through a slit pattern or a translucent film are not completely decomposed because the amount of a light irradiation is small. The polymers of a portion of the photoresist film blocked by a light-blocking film provided on the mask are hardly decomposed. After the photoresist film is developed, the portions containing the polymers, which are not decomposed, is left. At this time, the thickness of the portion with less light exposure is thinner than that of the portion without light exposure. Since too long exposure time decomposes all the molecules, it is necessary to adjust the exposure time.

The small thickness of the photoresist film may be obtained using reflow. That is, the photoresist film is made of a reflowable material and exposed to light through a normal mask having opaque and transparent portions. The photoresist film is then developed and subject to reflow such that portions of the photoresist film flows down onto areas without photoresist, thereby forming thin portions.

Next, the photoresist pattern PR and the underlying layers including the conductive layer 170, the contact layer 160 and the semiconductor layer 150 are etched such that the data wire and the underlying layers are left on the data areas A, only the semiconductor layer is left on the channel areas C, and all the three layers 170, 160 and 150 are removed to expose the gate insulating layer 140 on the remaining areas B.

Figure 9:
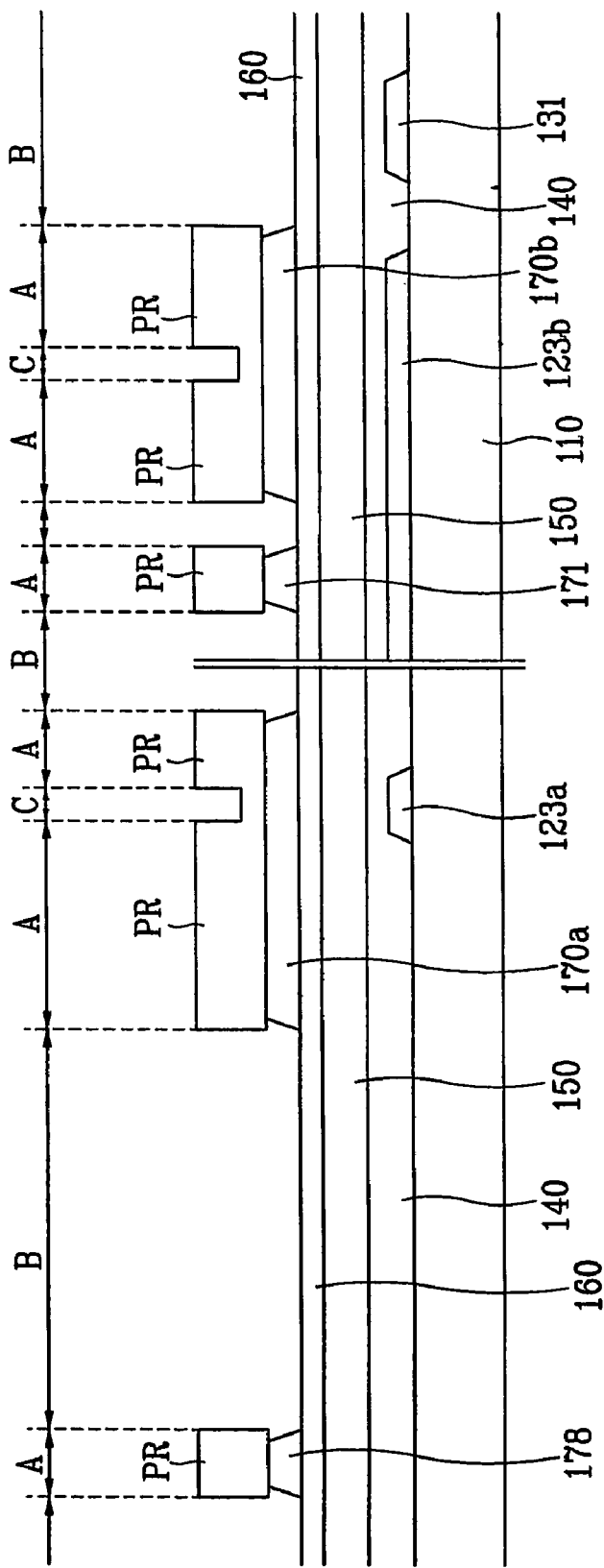

First, as shown in FIG. 9, the exposed portions of the conductive layer 170 on the other areas B are removed to expose the underlying portions of the contact layer 160. Both dry etch and wet etch are selectively used in this step and preferably performed under the condition that the conductive layer 170 is easily etched and the photoresist pattern PR are hardly etched. However, since it is hard to identify the above-described condition for dry etch, and the dry etch may be performed under the condition that the photoresist pattern PR and the conductive layer 170 are etched simultaneously. In this case, the portions of the photoresist pattern PR on the channel areas C for dry etch are preferably made to be thicker than those for the wet etch to prevent the removal of the portions of the photoresist pattern PR on the channel areas C and thus the exposure of the underlying portions of the conductive layer 170.

As a result, as shown in FIG. 9, only the portions 171, 170a and 170b of the conductive layer 170 on the channel areas C and the data areas A are left and the portions of the conductive layer 170 on the remaining areas B are removed to expose the underlying portions of the contact layer 160. Here, the data-wire conductors 171, 170a and 170b have substantially the same planar shapes as the data wire 171, 173a, 173b, 175a, 175b and 179 except that the source electrodes 173a and 173b and the drain electrodes 175a and 175b are not disconnected from but connected to each other. When using dry etch, the thickness of the photoresist pattern PR is reduced to an extent.

Next, as shown in FIG. 9, the exposed portions of the contact layer 160 and the underlying portions of the amorphous silicon layer 150 on the areas B as well as the portions of the photoresist pattern PR on the channel areas C are removed by dry etch. The etching is performed under the conduction that the photoresist pattern PR, the contact layer 160 and the semiconductor layer 150 are easily etched and the gate insulating layer 140 is hardly etched. (It is noted that etching selectivity between the intermediate layer and the semiconductor layer is nearly zero.) In particular, it is preferable that the etching ratios for the photoresist pattern PR and the semiconductor layer 150 are nearly the same. For instance, the etched thicknesses of the photoresist pattern PR and the semiconductor layer 150 can be nearly the same by using a gas mixture of $SF_6$ and HCl, or a gas mixture of $SF_6$ and $O_2$. When the etching ratios for the photoresist pattern PR and for the semiconductor pattern 150 are the same, the initial thickness of the portions of the photoresist pattern PR on the channel areas C is equal to or less than the sum of the thickness of the semiconductor layer 150 and the thickness of the contact layer 160.

Consequently, as shown in FIG. 10, the portions of the photoresist pattern PR on the channel areas C are removed to expose the underlying portions of source/drain ("S/D") conductors 170a and 170b, and the portions of the contact layer 160 and the semiconductor layer 150 on the remaining areas B are removed to expose the underlying portions of the gate insulating layer 140. In the meantime, the portions of the photoresist pattern PR on the data areas A are also etched to become thinner. Moreover, the semiconductor pattern 151, 154a, 154b and 158 is completed in this step. A plurality of ohmic contacts 161, 160a, 160b and 168 are formed on the semiconductor pattern 151, 154a, 154b and 158.

Then, photoresist remnants left on the surface of the S/D conductors 170a and 170b on the channel areas C are removed by ashing.

Figure 11A:
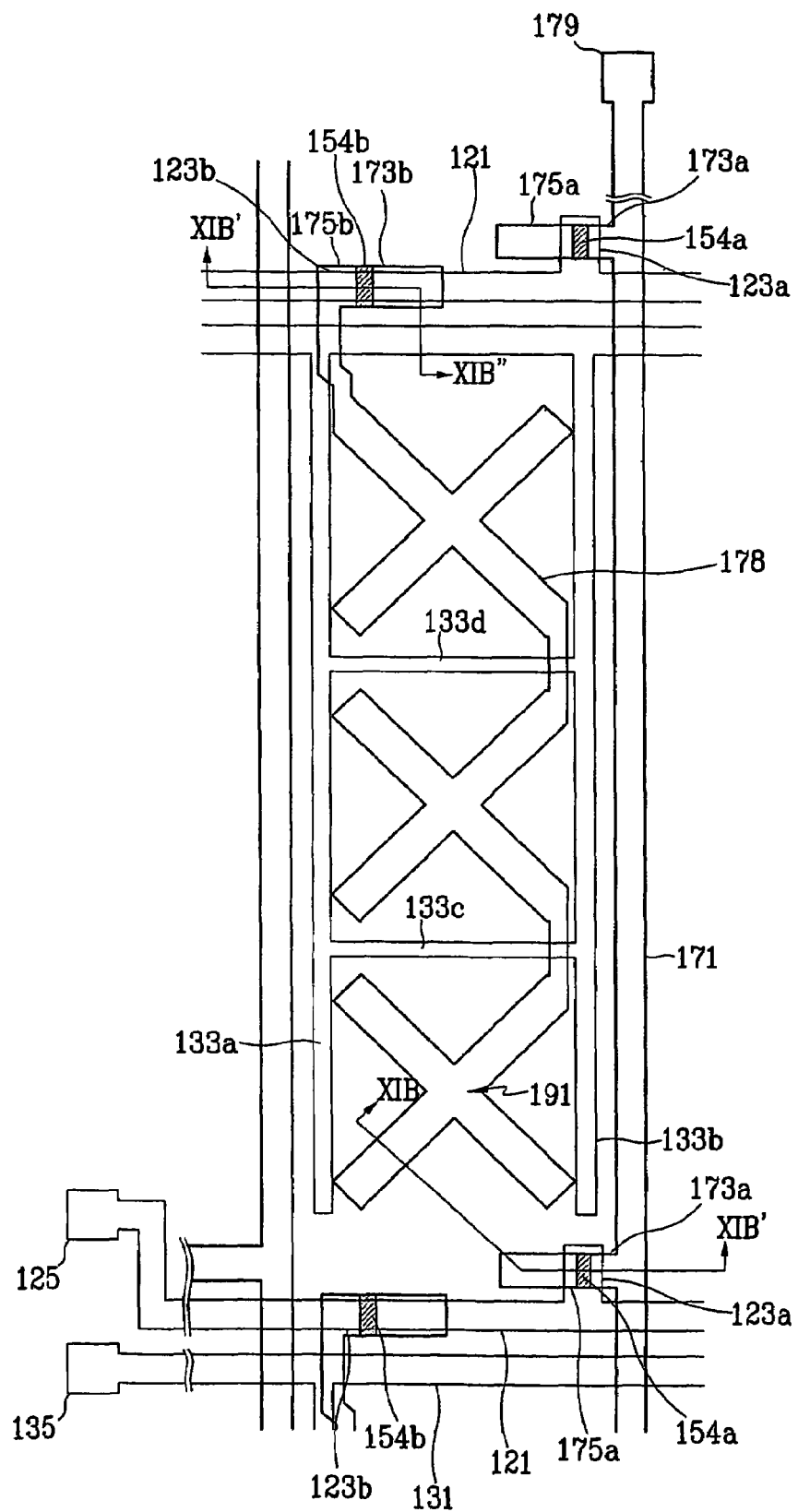
Figure 11B:
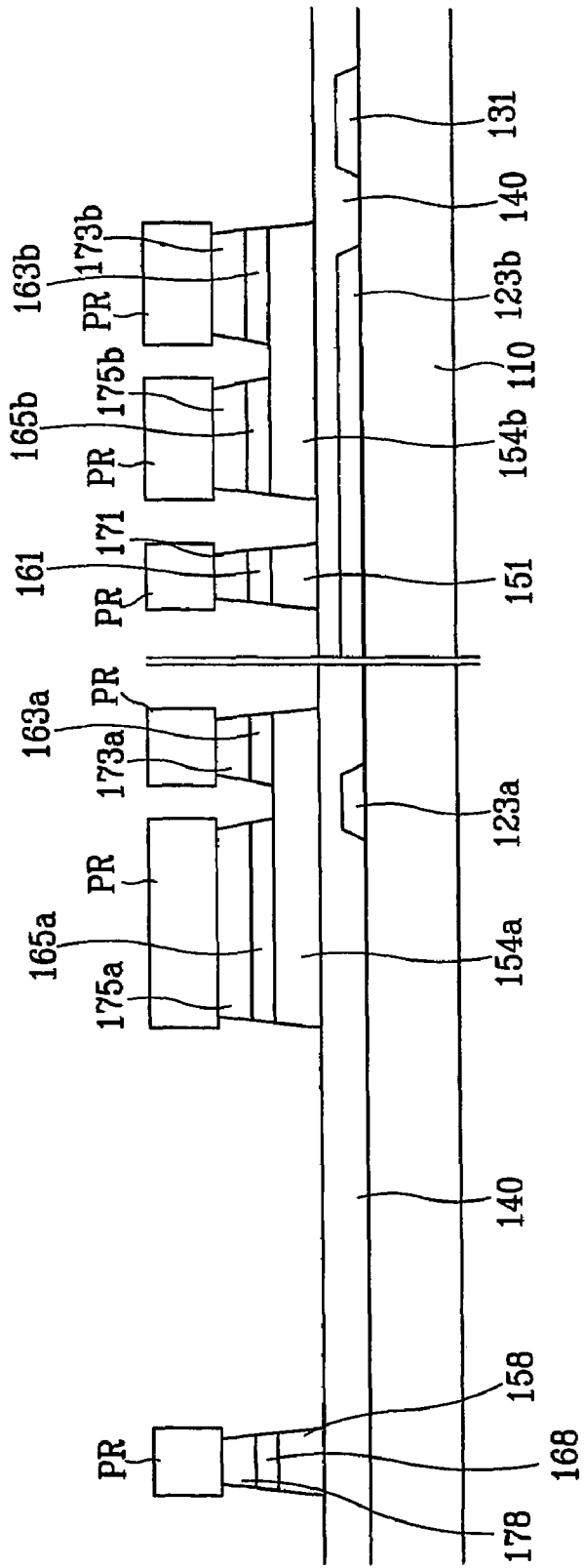

Next, as shown in FIGS. 11A and 11B, portions of the S/D conductors 170a and 170b and the underlying portions of the S/D ohmic contacts 160a and 160b on the channel areas C are etched to be removed. Here, the etching of both the S/D conductors 170a and 170b and the S/D ohmic contacts 160a and 160b may be done using only dry etching. Alternatively, the S/D conductors 170a and 170b are etched by wet etching and the S/D ohmic contacts 160a and 160b are etched by dry etching. In the former case, it is preferable to perform the etching under the condition that etching selectivity between the S/D conductors 170a and 170b and the S/D ohmic contacts 160a and 160b is high. It is because the low etching selectivity makes the determination of the etching finish point difficult, thereby causing the adjustment of the thickness of the portions of the semiconductor pattern 154a and 154b left on the channel areas C to be difficult. In the latter case alternately applying wet etching and dry etching, a stepwise lateral sidewall is formed since the wet etch etches the lateral sides of the S/D conductors 170a and 170b, while the dry etch hardly etches the lateral sides of the S/D ohmic contacts 160a and 160b. Examples of etching gases used for etching the S/D ohmic contacts 160a and 160b are a gas mixture of $CF_4$ and HCl and a gas mixture of $CF_4$ and $O_2$. Use of the gas mixture of $CF_4$ and $O_2$ enables to obtain uniform thickness of etched portions of the semiconductor pattern 154a and 154b. In this regard, the exposed portions of the semiconductor pattern 154a and 154b are etched to have a reduced thickness, and the portions of the photoresist pattern PR on the data-wire areas A are also etched to have a reduced thickness. This etching is performed under the condition that the gate insulating layer 140 is not etched, and it is preferable that the photoresist pattern PR is thick enough to prevent the portions of the photoresist pattern PR on the data-wire areas A from being removed to expose the underlying portions of the data wire 171, 173a, 173b, 175a, 175b and 179.

Accordingly, the source electrodes 173a and 173b and the drain electrodes 175a and 175b are separated from each other, and, simultaneously, the data wire 171, 173a, 173b, 175a, 175b and 179 and the ohmic contact pattern 161, 163a, 163b, 165a and 165b thereunder are completed.

Finally, the portions of the photoresist pattern PR left on the data areas A are removed. Alternatively, the portions of the photoresist pattern PR on the data areas A are removed after the portions of the S/D conductors 170a and 170b on the channel areas C are removed and before the underlying portions of the S/D ohmic contacts 160a and 160b are removed.

As described above, wet etching and dry etching may be performed one after the other, but only dry etching may be used. The latter is relatively simple but it is not easy to find a proper etching condition compared with the former. On the contrary, it is easy to find a proper etching condition for the former case but the former is relatively complicated compared with the latter.

Thereafter, as shown in FIGS. 4 and 5, a passivation layer 180 is formed by growing a-Si:C:O or a-Si:O:F by CVD, by depositing silicon nitride, or by coating an organic insulating material such as acryl-based material. When forming an a-Si:C:O layer, $SiH(CH_3)_3$, $SiO_2(CH_3)_4$, $(SiH)_4O_4(CH_3)_4$, $Si(C_2H_5O)_4$ or the like used as basic source, oxidant such as $N_2O$ or $O_2$, and Ar or He are mixed in gaseous states to flow for the deposition. For an s-Si:O:F layer, the deposition is performed with flowing a gas mixture including $SiH_4$, $SiF_4$ or the like and an additional gas of $O_2$. $CF_4$ may be added as a secondary source of fluorine.

As shown in FIGS. 4 and 5, the passivation layer 180 together with the gate insulating layer 140 is photo-etched to form a plurality of contact holes 181, 182, 183, 184, 185 and 186 exposing the first drain electrodes 175a, the second source electrodes 173b, the storage electrode lines 131, the gate pads 125, the storage pads 135 and the data pads 179. It is preferable that the area of the contact holes 184, 185 and 186 exposing the pads 125, 179 and 135 is equal to or larger than 0.5 mm×15 μm and not larger than 2 mm×60 μm. (Third Mask)

Finally, an ITO layer or an IZO layer with a thickness of 1500-500 Å is deposited and photo-etched to form a plurality of pixel electrodes 190 connected to the drain electrodes 175, a plurality of subsidiary gate pads 95 connected to the gate pads 125, a plurality of subsidiary data pads 97 connected to the data pads 179, and a plurality of bridges 92 connecting the second source electrodes 173b and the storage electrode lines 131. (Fourth Mask)

Since Cr etchant can be used as an etchant for an IZO layer, the exposed portions of the metal for the data wire and the gate wire through the contact holes are not corroded in the photo-etching step for forming the pixel electrodes 190, the subsidiary gate pads 95, the subsidiary data pads 97 and the bridges 92 from the IZO layer. An example of the Cr etchant is $(HNO_3/(NH_4)_2Ce(NO_3)_6/H_2O)$. The IZO layer is, deposited at temperature preferably in a range from a room temperature to 200° C. for minimizing the contact resistance at the contacts. A preferred example of a target for the IZO layer includes $In_2O_3$ and ZnO. The content of ZnO is preferably in a range between 15 atm % and 20 atm %.

Meanwhile, nitrogen gas is preferably used for the preheating process before the deposition of the ITO layer or the IZO layer. This is to prevent the formation of metal oxides on portions of the metallic layers exposed through the contact holes 181, 182, 183, 184, 185 and 186.

Figure 12:
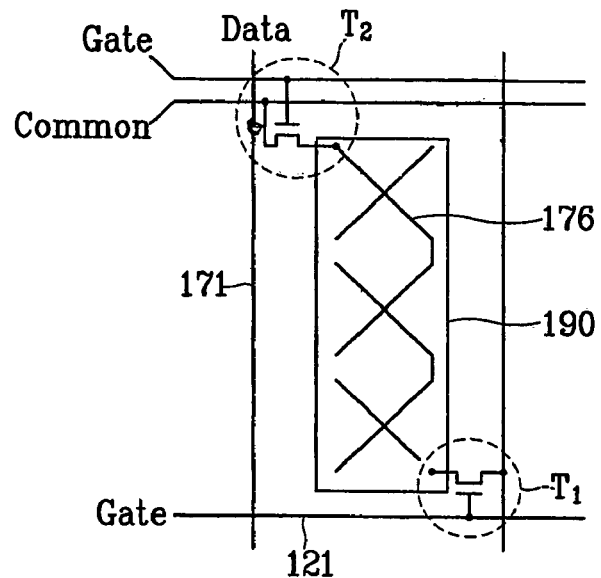
FIG. 12 is a schematic diagram of TFT array panels for an LCD according to first and second embodiments of the present invention.

FIG. 12 is a schematic diagram of the TFT array panels for an LCD shown in FIGS. 2A and 4 according to an embodiment of the present invention.

A TFT T1 connected to a data line 171 switches signals transmitted to a pixel electrode 190 while a TFT T2 connected to a storage electrode line switches signals entering a DCE 178. The pixel electrode 190 and the DCE 178 is capacitively coupled. For the same gray, there is no variation of the potential difference between the DCE 178 and the pixel electrode 190. Therefore, stability of image quality is ensured irrespective of inversion types such as line inversion, dot inversion or the like.

A source electrode of a DCE TFT according to the first and the second embodiments of the present invention is connected to a storage electrode line. However, the source electrode may be connected to a previous data line, which has some problems.

First, the application of the gate-on voltage to a previous gate line (represented as Gate N-1 in FIG. 1) causes a pixel electrode located diagonal to a relevant pixel applied with a gray voltage and a DCE of the relevant pixel applied with an initial voltage. The initial voltage of the DCE is equal to the gray voltage of the diagonally-located pixel electrode. Accordingly, the potential difference $V_{DP}$ between the DCE and a pixel electrode of the relevant pixel is determined by the gray voltage of the diagonally-located pixel electrode. For example, a low gray voltage such as a black voltage applied to the diagonally-located pixel electrode causes the low initial voltage of the DCE, thereby resulting in a low $V_{DP}$. A low $V_{DP}$ means that the potential difference between the DCE and the pixel electrode is small, and thus lateral field due to the DCE is weak. Accordingly, the arrangement of the liquid crystal molecules is unstable, thereby causing texture.

Next, the $V_{DP}$ is defined by a voltage across a capacitor CDP, which is serially connected to an equivalent capacitor of $C_{LC}$ and $C_{ST}$. Accordingly, the value of $V_{DP}$ increases as the capacitance $C_{DP}$ decreases. For reducing the capacitance CDP, the overlapping area between the pixel electrode and the DCE is designed to be minimized. However, this may cause image quality to be sensitively varied by misalignment of a mask during a manufacturing process and light leakage near the DCE. For the former case, the mask misalignment changes the overlapping area of the pixel electrode and the DCE, and this directly affect on the image quality. The latter case occurs when the initial voltage of the DCE is high (that is, the gray voltage applied to the diagonally-located pixel electrode is high) and a black voltage is applied to the relevant pixel. The high voltage of the DCE forces to move the liquid crystal molecules to yield light leakage, which may not be blocked by the narrow DCE. The light leakage decreases contrast ratio.

A third embodiment for solving these problems will be described now.

Figure 13:
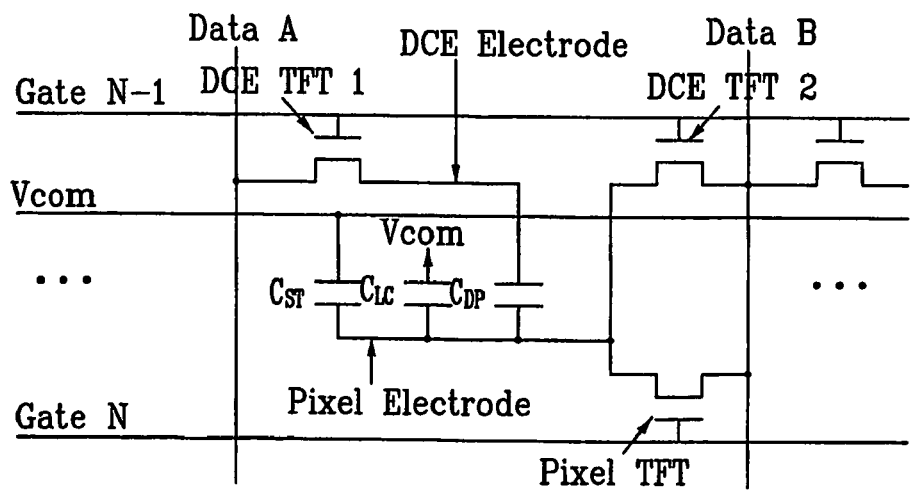
FIG. 13 is an equivalent circuit diagram of an LCD according to a third embodiment of the present invention.

FIG. 13 is an equivalent circuit diagram of an LCD according to a third embodiment of the present invention.

An LCD according to an embodiment of the present invention includes a TFT array panel, a color filter array panel opposite the TFT array panel, and a liquid crystal layer interposed therebetween. The TFT array panel is provided with a plurality of gate lines and a plurality of data lines intersecting each other to define a plurality of pixel areas, and a plurality of storage electrode lines extending parallel to the gate lines. The gate lines transmit scanning signals and the data lines transmit image signals. A common voltage Vcom is applied to the storage electrode lines. Each pixel area is provided with a pixel TFT for a pixel electrode and first and second DCE TFTs DCETFT1 and DCETFT2 for a DCE. The pixel TFT includes a gate electrode connected to a relevant gate line, a source electrode connected to a relevant data line, and a drain electrode connected to a relevant pixel electrode. The first DCE TFT includes a gate electrode connected to a previous gate line, a source electrode connected to a previous data line, and a drain electrode connected to a relevant DCE, while the second DCE TFT includes a gate electrode connected to the previous gate line, a source electrode connected to the relevant data line, and a drain electrode connected to the relevant pixel electrode.

The DCE is capacitively coupled with the pixel electrode, and the capacitor therebetween or its capacitance is represented by $C_{DP}$. The pixel electrode and a common electrode provided on the color filter array panel form a liquid crystal capacitor, and the liquid crystal capacitor or its capacitance is represented by $C_{LC}$. The pixel electrode and a storage electrode connected to one of the storage electrode lines form a storage capacitor, and the storage capacitor or its capacitance is represented by $C_{ST}$.

Although it is not shown in the circuit diagram, the pixel electrode according to an embodiment of the present invention has an aperture overlapping the DCE such that the electric field due to the DCE flows out through the aperture. The electric field flowing out through the aperture makes the liquid crystal molecules have pretilt angles. The pretilted liquid crystal molecules are rapidly aligned without dispersion along predetermined directions upon the application of the electric field due to the pixel electrode.

The LCD is assumed to be subject to dot inversion. The application of a gate-on signal to the previous gate line Gate N-1 turns on both the DCE TFTs DCETFT1 and DCETFT2 to make the DCE have a (+) gray voltage and to make the pixel electrode have a (-) gray voltage. The initial voltage of the DCE is the difference between the positive gray voltage and the negative gray voltage from the data lines Data A and Data B, respectively, which is twice or more the initial voltage of the DCE without the second DCE TFT DCETFT2. When the pixel TFT is turned on and the DCE TFTs DCETFT1 and DCETFT2 are turned off upon application of the gate-on signal to the relevant gate line Gate N, the DCE floats and thus the potential of the DCE also increases with maintaining the potential difference $V_{DP}$ from the potential of the pixel electrode. Accordingly, the structure according to the third embodiment ensures higher $V_{DP}$ to enhance the stability of the arrangement of the liquid crystal molecules, thereby stabilizing the texture.

Furthermore, since the $V_{DP}$ is determined by the gray voltages of two adjacent previous pixels and is rarely affected by the capacitance $C_{DP}$, the capacitance $C_{DP}$ need not be reduced to allow the DCE to have a sufficient width for overlapping the pixel electrode. Accordingly, the light leakage near the DCE is blocked and the image quality is not considerably affected by the mask misalignment.

In addition, the high VDP improves the response time and the afterimage.

The structure shown in FIG. 13 is suitable for dot inversion and line inversion, while other structures having modified connections of three TFTs may be adapted for other types of inversion.

Now, an exemplary TFT array panel for an LCD according to the third embodiment of the present invention is described in detail with reference to FIGS. 14 to 17.

Figure 14:
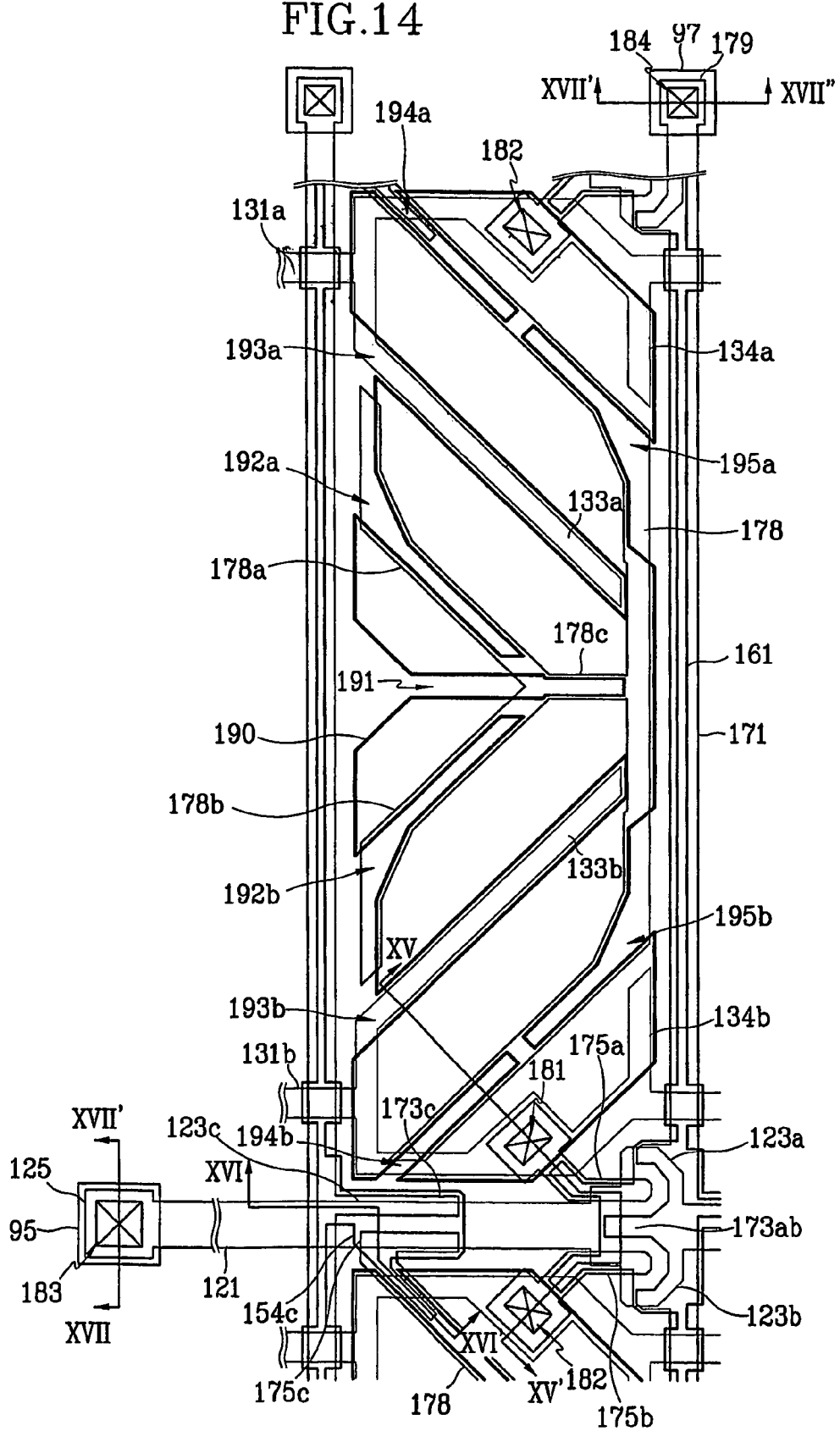
FIG. 14 is a layout view of an LCD according to a third embodiment of the present invention.
Figure 15:
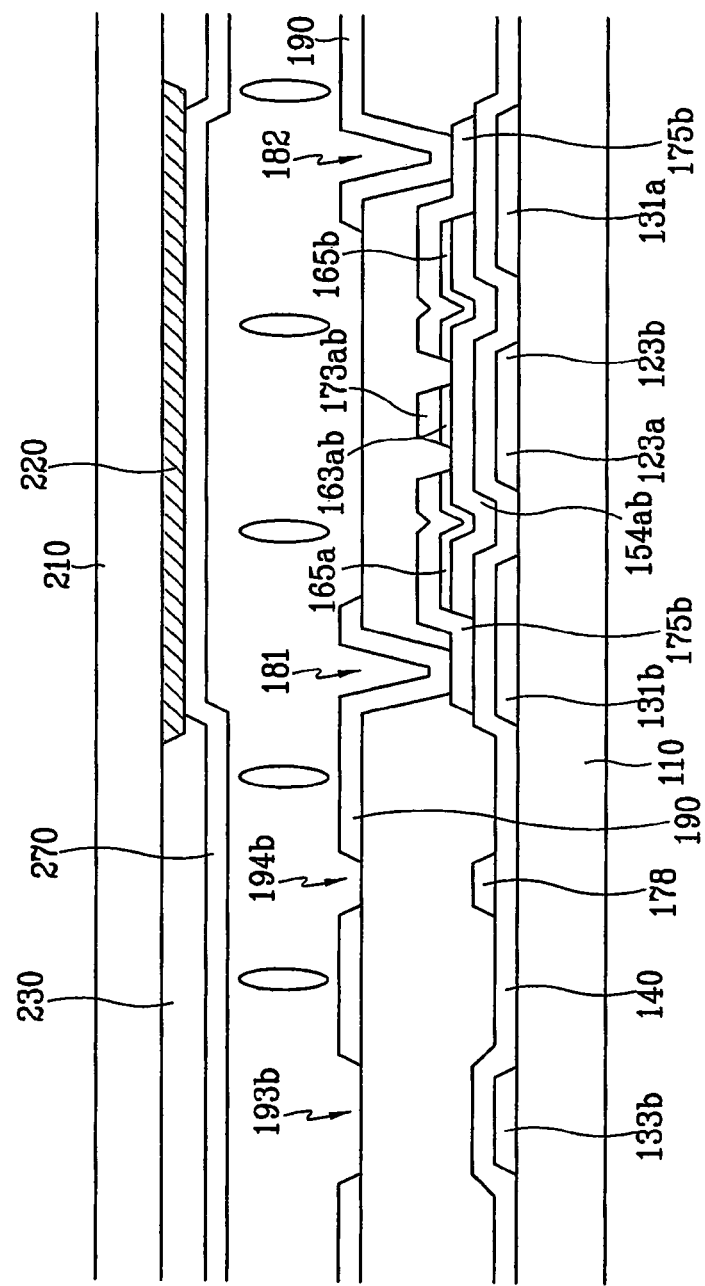
FIG. 15 is a sectional view of the LCD shown in FIG. 14 taken along the line XV-XV'.
Figure 16:
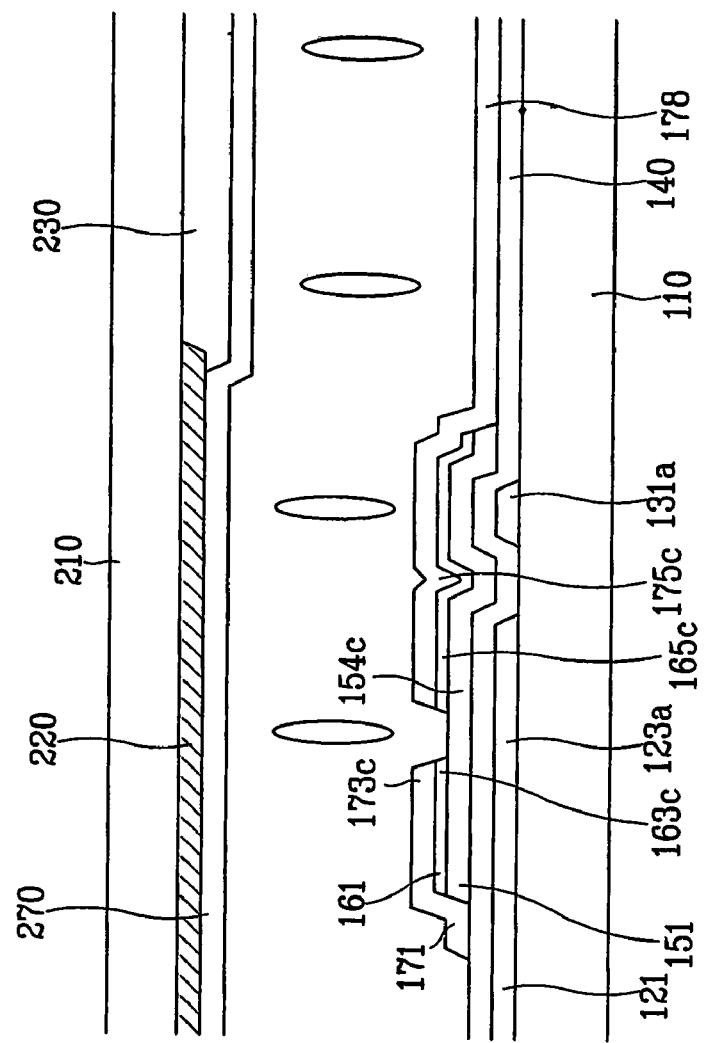
FIG. 16 is a sectional view of the LCD shown in FIG. 14 taken along the line XVI-XVI'.
Figure 17:
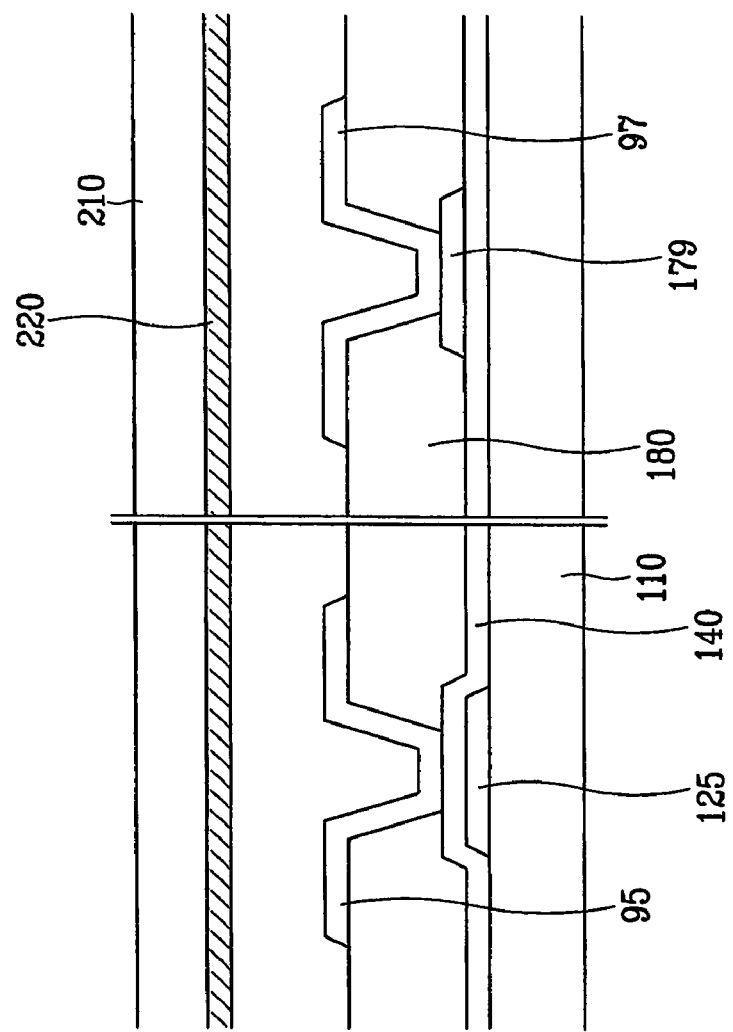
FIG. 17 is a sectional view of the LCD shown in FIG. 14 taken along the lines XVII-XVII' and XVII'-XVII"

FIG. 14 is a layout view of an LCD according to the third embodiment of the present invention, FIG. 15 is a sectional view of the LCD shown in FIG. 14 taken along the line XV-XV', FIG. 16 is a sectional view of the LCD shown in FIG. 14 taken along the line XVI-XVI', FIG. 17 is a sectional view of the LCD shown in FIG. 14 taken along the lines XVII-XVII' and XVII'-XVII".

An LCD according to a third embodiment of the present invention includes a lower panel, an upper panel facing the lower panel, and a vertically aligned liquid crystal layer interposed between the lower panel and the upper panel.

The lower panel will now be described more in detail.

A plurality of gate lines 121 are formed on an insulating substrate 110 and a plurality of data lines 171 are formed thereon. The gate lines 121 and the data lines 171 are insulated from each other and intersect each other to define a plurality of pixel areas.

Each pixel area is provided with a pixel TFT, a first DCE TFT, a second DCE TFT, a DCE and a pixel electrode. The pixel TFT has three terminals, a first gate electrode 123a, a first source electrode 173ab and a first drain electrode 175a. The first DCE TFT has three terminals, a second gate electrode 123b, the first source electrode 173ab and a second drain electrode 175b while the second DCE TFT has three terminals, a third gate electrode 123c, a second source electrode 173c and a third drain electrode 175c. The first source electrode 173ab is used both for the pixel TFT and the first DCE TFT. The pixel TFT and the first DCE TFT are provided for switching the signals transmitted to the pixel electrode 190 while the second DCE TFT is provided for switching the signals entering the DCE 178. The gate electrode 123a, the source electrode 173a and the drain electrode 175a of the pixel TFT are connected to relevant one of the gate lines 121, relevant one of the data lines 171 and the pixel electrode 190, respectively. The gate electrode 123b, the source electrode 173b and the drain electrode 175b of the first DCE TFT are connected to previous one of the gate lines 121, the relevant data line 171 and the pixel electrode 190, respectively. The gate electrode 123c, the source electrode 173c and the drain electrode 175c of the second DCE TFT are connected to the previous gate line 121, previous one of the data lines 171 and the DCE 178, respectively. The DCE 178 is applied with a direction-controlling voltage for controlling the pre-tilts of the liquid crystal molecules to generate a direction-controlling electric field between the DCE 178 and the common electrode 270. The DCE 178 is formed in a step for forming the data lines 171.

The layered structure of the lower panel will be described in detail.

A plurality of gate lines 121 extending substantially in a transverse direction are formed on an insulating substrate 110, and a plurality of first to third gate electrodes 123a-123c are connected to the gate lines 121. A plurality of gate pads 125 are connected to one ends of the gate lines 121.

A plurality of first and second storage electrode lines 131a and 131b and a plurality of sets of first to fourth storage electrodes 133a, 133b, 133c and 133d are also formed on the insulating substrate 110. The first and the second storage electrode lines 131a and 131b extend substantially in the transverse direction. The first and the second storage electrodes 133a and 133b extend from the first and the second storage electrode lines 131a and 131b in a longitudinal direction and are curved to extend in an oblique direction while the third and the fourth storage electrodes 134a and 134b extend in the longitudinal direction. A first storage wire including the first storage electrode lines 131a and the first and the third electrodes 133a and 134a and a second storage wire including the second storage electrode lines 131b and the second and the fourth electrodes 133b and 134b have inversion symmetry.

The gate wire 121, 123a-123c and 125 and the storage electrode wire 131, 133a, 133b, 134a and 134b are preferably made of Al, Cr or their alloys, Mo or Mo alloy. If necessary, the gate wire 121, 123a and 123b and the storage electrode wire 131 and 133a-133d include a first layer preferably made of Cr or Mo alloys having excellent physical and chemical characteristics and a second layer preferably made of Al or Ag alloys having low resistivity.

A gate insulating layer 140 is formed on the gate wire 121, 123a-123c and 125 and the storage electrode wire 131, 133a, 133b, 134a and 134b.

A semiconductor layer 151, 154ab and 154c preferably made of amorphous silicon is formed on the gate insulating layer 140. The semiconductor layer 151, 154ab and 154c includes a plurality of first and second channel semiconductors 154ab and 154c forming channels of TFTs and a plurality of data-line semiconductors 151 located under the data lines 171.

An ohmic contact layer 161, 163ab, 163c and 165a-165c preferably made of silicide or n+ hydrogenated amorphous silicon heavily doped with n type impurity is formed on the semiconductor layer 151, 154ab and 154c.

A data wire 171, 173ab, 173c, 175a-175c and 179 is formed on the ohmic contact layer 161, 163ab, 163c and 165a-165c and the gate insulating layer 140. The data wire 171, 173ab, 173c, 175a-175c and 179 includes a plurality of data lines 171 extending in the longitudinal direction and intersecting the gate lines 121 to form a plurality of pixels, a plurality of first source electrodes 173ab branched from the data lines 171 and extending onto portions 163ab of the ohmic contact layer, a plurality of first and second drain electrodes 175a and 175b disposed on portion 165a and 165b of the ohmic contact layer, located opposite the first source electrodes 173ab and separated from the first source electrodes 173ab, a plurality of second source electrodes 173c and a plurality of third drain electrodes 175c disposed on respective portions 163c and 165c opposite each other with respect to the third gate electrodes 123c, and a plurality of data pads 179 connected to one ends of the data lines 171 to receive image signals from an external device.

A plurality of DCEs 178 and 178a-178c are formed in the pixel areas defined by the intersections of the gate lines 121 and the data lines 171. Each DCE 178 and 178a-178c includes a V-shaped stem 178 with a chamfered bottom and a chevron-shaped branch 178a-178c and is connected to the third drain electrode 175c. The data wire 171, 173ab, 173c, 175a-175c and 179 and the DCEs 178 and 178a-178c are preferably made of Al, Cr or their alloys, Mo or Mo alloy. If necessary, the data wire 171, 173ab, 173c, 175a-175c and 179 and the DCEs 178 and 178a-178c include a first layer preferably made of Cr or Mo alloys having excellent physical and chemical characteristics and a second layer preferably made of Al or Ag alloys having low resistivity.

A passivation layer 180 preferably made of silicon nitride or organic insulator is formed on the data wire 171, 173ab, 173c, 175a-175c and 179.

The passivation layer 180 is provided with a plurality of first and second contact holes 181 and 182 exposing the first and the second drain electrodes 175a and 175b, a plurality of third contact holes 183 extending to the gate insulating layer 140 exposing the gate pads 125, and a plurality of fourth contact holes 184 exposing the data pads 179. The contact holes exposing the pads 125 and 179 may have various shapes such as polygon or circle. The area of the contact hole is preferably equal to or larger than 0.5 mm×15 μm and not larger than 2 mm×60 μm.

A plurality of pixel electrodes 190 are formed on the passivation layer 180. Each pixel electrode 190 is connected to the first and the second drain electrode 175a and 175b through the first and the second contact holes 181 and 182, respectively. The pixel electrode 190 has a transverse cutout 191 and a plurality of oblique cutouts 192a, 192b, 193a, 193b, 194a, 194b, 195a and 195b. The transverse cutout 191 bisects the pixel electrode 190 into upper and lower halves, and the oblique cutouts 192a, 192b, 193a, 193b, 194a, 194b, 195a and 195b have inversion symmetry with respect to the transverse cutout 191. Some cutouts 191, 192a, 192b, 194a, 194b, 195a and 195b overlap the DCE 178 and 178a-178c while the other cutouts 193a and 193b overlap the storage electrodes 133a and 133b.

Furthermore, a plurality of subsidiary gate pads 95 and a plurality of subsidiary data pads 97 are formed on the passivation layer 180. The subsidiary gate pads 95 and the subsidiary data pads 97 are connected to the gate pads 125 and the data pads 179 through the contact holes 183 and 184. The pixel electrodes 190, the subsidiary gate pads 95 and the subsidiary data pads 97 are preferably formed of IZO. Alternatively, the pixel electrodes 190 and the subsidiary pads 95 and 97 are preferably made of ITO.

To summarize, each pixel electrode 190 has the plurality of cutouts 191, 192a, 192b, 193a, 193b, 194a, 194b, 195a and 195b for partitioning a pixel region into a plurality of domains, and some cutouts 191, 192a, 192b, 194a, 194b, 195a and 195b overlap the DCE 178 and 178a-178c. The DCE 178 and 178a-178c and the cutouts 191, 192a, 192b, 194a, 194b, 195a and 195b are aligned such that the DCE 178 and 178a-178c is exposed through the cutouts 191, 192a, 192b, 194a, 194b, 195a and 195b to be seen in front view. The DCE 178 and 178a-178c is connected to the second DCE TFT while the pixel electrode 190 is connected to the first DCE TFT the pixel TFT, and the pixel electrode 190 and the DCE 178 are aligned to form a storage capacitance.

According to another embodiment of the present invention, the DCEs 178 and 178a-178c include substantially the same layer as the gate wire 121, 123a-123c and 125. The portions of the passivation layer 180 on the DCEs 178 and 178a-178c may be removed to form a plurality of openings.

The upper substrate 210 will no be described in detail.

A black matrix 220 for preventing light leakage, a plurality of red, green and blue color filters 230, and a common electrode 270 preferably made of a transparent conductor such as ITO or IZO are formed on an upper substrate 210 preferably made of transparent insulating material such glass.

A plurality of liquid crystal molecules contained in the liquid crystal layer 3 is aligned such that their director is perpendicular to the lower and the upper substrates 110 and 210 in absence of electric field. The liquid crystal layer 3 has negative dielectric anisotropy.

The lower substrate 110 and the upper substrate 210 are aligned such that the pixel electrodes 190 exactly match and overlap the color filters 230. In this way, a pixel region is divided into a plurality of domains by the cutouts 191, 192a, 192b, 193a, 193b, 194a, 194b, 195a and 195b. The alignment of the liquid crystal layer 3 in each domain is stabilized by the DCE-178 and 178a-178c.

This embodiment illustrates the liquid crystal layer 3 having negative dielectric anisotropy and homeotropic alignment with respect to the substrates 110 and 210. However, the liquid crystal layer 3 may have positive dielectric anisotropy and homogeneous alignment with respect to the substrates 110 and 210.

A TFT array panel according to the third embodiment of the present invention may be manufactured using four photo-etching steps. In this case, a data wire and DCEs have a triple-layered structure including an amorphous silicon layer, an ohmic contact layer and a metal layer, and the triple layers have substantially the same planar shape, which is resulted from the patterning of the amorphous silicon layer, the ohmic contact layer and the metal layer using a photoresist film. Since such a manufacturing method is described in detail in the description about the second embodiment of the present invention, the manufacturing method is understood in view of the fact that the patterns made of the same layer(s) are formed in the same step and thus the detailed description thereof is omitted.

In the above-structured liquid crystal display, the domain partitioning is made by way of the apertures of the pixel electrode, and the domain stability is reinforced by way of the direction control electrode and the storage electrode. Therefore, the domain partitioning depends upon the arrangement of the pixel electrode apertures, the direction control electrode and the storage electrode, and the domain stability is also largely influenced by the arrangement.

Various types of arrangement of the pixel electrode apertures, the direction control electrode and the storage electrode will be explained as fourth to sixteenth preferred embodiments of the present invention. Therefore, the explanation will be now made while focusing upon the arrangement of the pixel electrode apertures, the direction control electrode and the storage electrode.

Furthermore, those arrangements related to the fourth to the sixteenth preferred embodiments can be well adapted for use in the structure related to the first to the third preferred embodiments.

Figure 18:
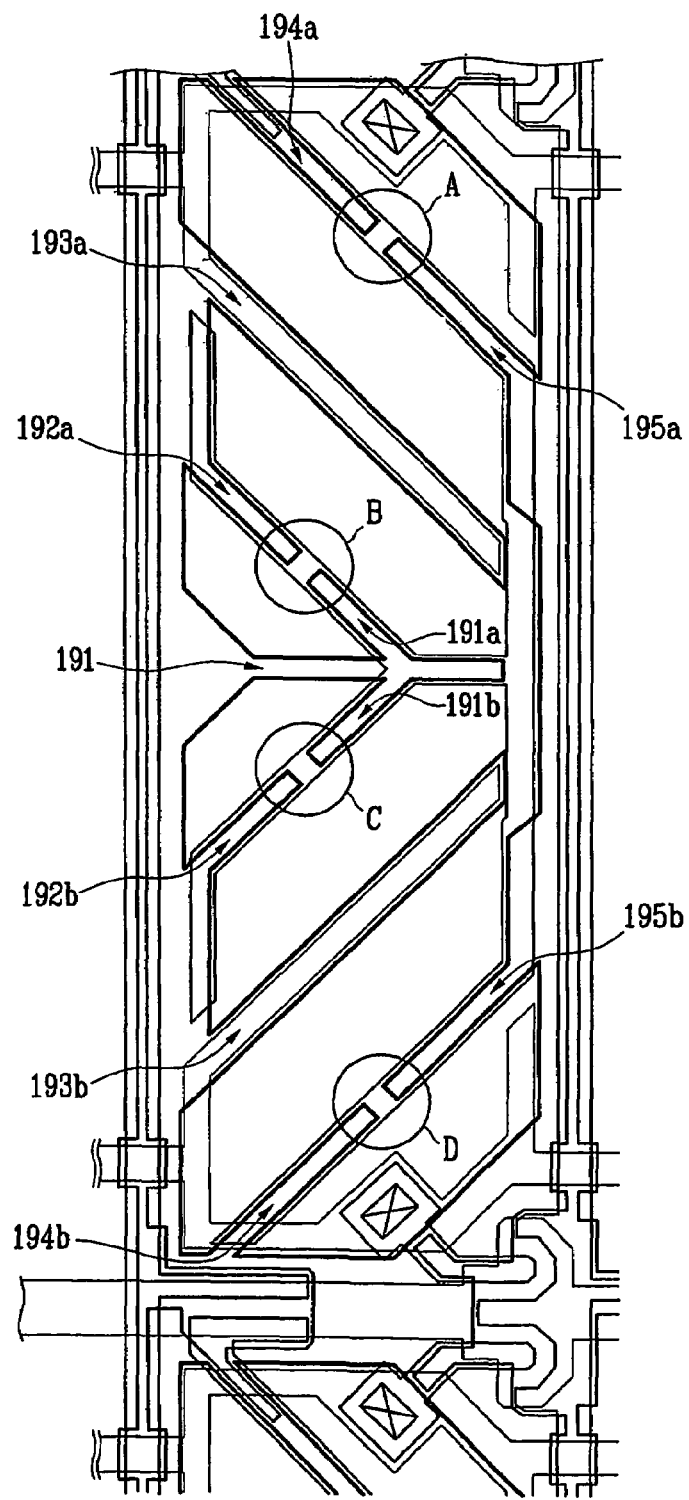
FIGS. 18 to 30 are layout views of TFT array panels for an LCD according to fourth to sixteenth embodiments of the present invention.

FIG. 18 is a plan view of a thin film transistor array panel for a liquid crystal display according to the fourth preferred embodiment of the present invention.

The pixel electrode apertures will be first explained.

The pixel electrode apertures are classified into horizontal apertures and inclined apertures 191a, 191b, 192a, 192b, 193a, 193b, 194a, 194b, 195a and 195b. Tie horizontal aperture 191 proceeds from the left side of the pixel electrode 190 to the right side thereof. The inlet edges of the horizontal aperture 191 are cut away. That is, the horizontal aperture 191 is wholly shaped with a funnel. The horizontal aperture 191 bisects the pixel electrode 190 up and down. The inclined apertures 191a, 191b, 192a, 192b, 193a, 193b, 194a, 194b, 195a and 195b are inversion-symmetrical to each other around the horizontal aperture 191. The upper-sided apertures 191a, 192a, 193a, 194a and 195a and the lower-sided apertures 191b, 192b, 193b, 194b and 195b around the horizontal aperture 191 are substantially angled to each other by 90°. Some inclined apertures 192a, 192b, 193a and 193b proceed from the left side of the pixel electrode 190 to right side thereof. Other inclined apertures 195a and 195b proceed from the right side of the pixel electrode 190 to the left side thereof. Still other two inclined apertures 194a and 194b proceed from the top and the bottom of the pixel electrode 190 to the right side thereof. The apertures 191a and 191b proceed from the center of the horizontal aperture 191 to the left side thereof, respectively. The apertures 192a, 192b, 194a and 194b are paired with the apertures 191a, 191b, 195a and 195b, and each of the pairs is arranged at the same rectilinear line. Furthermore, the two right top and bottom edges of the pixel electrode 190 are cut away in the inclined direction while forming inclined sides proceeding parallel to the apertures 194a and 194b.

The pixel electrode 190 is divided into eight micro portions by way of the apertures 191, 191a, 191b, 192a, 192b, 193a, 193b, 194a, 194b, 195a and 195b. The respective micro portions define the plane area of the respective pixel domains. Therefore, with this preferred embodiment, the pixel region is partitioned into eight domains. The eight domains are classified into four kinds depending upon the alignment directions of the liquid crystal molecules therein under the application of electric fields. At this time, the eight domains are all structured such that the two long sides of each domain proceed parallel to each other to maximize the speed of alignment of the liquid crystal molecules and the stability thereof.

As it is established that the picture signals be applied to all of the eight micro portions of the pixel electrode 190, bridges for interconnecting the micro pixel electrode portions should be formed. The bridges are positioned at the locations A, B, C and D where the apertures 192a, 192b, 194a and 194b and the apertures 191a, 191b, 195a and 195b face each other, and at the right side of the pixel electrode 190 where the apertures 191, 193a and 193b are terminated. The domain partitioning is not made at the bridge locations, and hence, textures are liable to occur at those locations. This may deteriorate the domain stability. With this preferred embodiment, as the bridges are arranged at the locations A, B, C and D where the apertures 192a, 192b, 194a and 194b and the apertures 191a, 191b, 195a and 195b face each other, it is established that the bridges are placed at the long side center of the domain where the stability of alignment of the liquid crystal molecules is high. Consequently, the influential power of the bridges becomes largely reduced, and the textures are not made. The direction control electrode 178 and 178c and the storage electrode 133a and 133b are positioned close to each other around the bridge positioned at the right side of the pixel electrode 190 where the apertures 191, 193a and 193b are terminated, to thereby form a strong fringe field. Such a fringe field prohibits occurrence of textures due to the bridges. Furthermore, the bridge positioned at the right side of the pixel electrode 190 where the apertures 191, 193a and 193b are terminated is overlapped with the direction control electrode 178. Therefore, even if any texture is made, the direction control electrode 178 can shadow such a texture.

The inter-arrangement of the apertures, the direction control electrode and the storage electrode will be now explained.

The direction control electrode 178, 178a, 178b and 178c is overlapped with some apertures 191, 191a, 191b, 192a, 192b, 194a, 194b, 195a and 195b, and surrounds the right side of some micro portions of the pixel electrode 190 and the right side of other micro portions while being overlapped with the bridges for interconnecting the micro portions of the pixel electrode 190.

Some storage electrodes 133a and 133b are overlapped with the apertures 193a and 193b as well as with the left side of some micro portions of the pixel electrode 190. Other storage electrodes 134a and 135b are overlapped with the right side of some micro portions of the pixel electrode 190. The storage electrode lines 131a and 131b are overlapped with the upper-sided periphery and the lower-sided periphery of the pixel electrode 190 while surrounding the right top and bottom inclined sides of the pixel electrode 190.

The direction control electrode 178, 178a, 178b and 178c and the storage electrode wire 131, 133a, 133b, 134a and 134b are arranged in an alternate manner.

As described above, with the fourth preferred embodiment, the two long sides of the pixel domain proceed parallel to each other to thereby maximize the speed of alignment of the liquid crystal molecules, and the stability thereof. The pixel electrode bridges are placed at the long side center of the pixel domain where the stability of alignment of the liquid crystal molecules is high. In this way, the influential power of the bridge becomes extremely decreased while prohibiting occurrence of the textures. Furthermore, the bridges are positioned at the locations where the direction control electrode 178 and 178c and the storage electrode 133a and 133b are positioned close to each other while forming a strong fringe field, thereby preventing occurrence of the textures due to the bridges.

Figure 19:
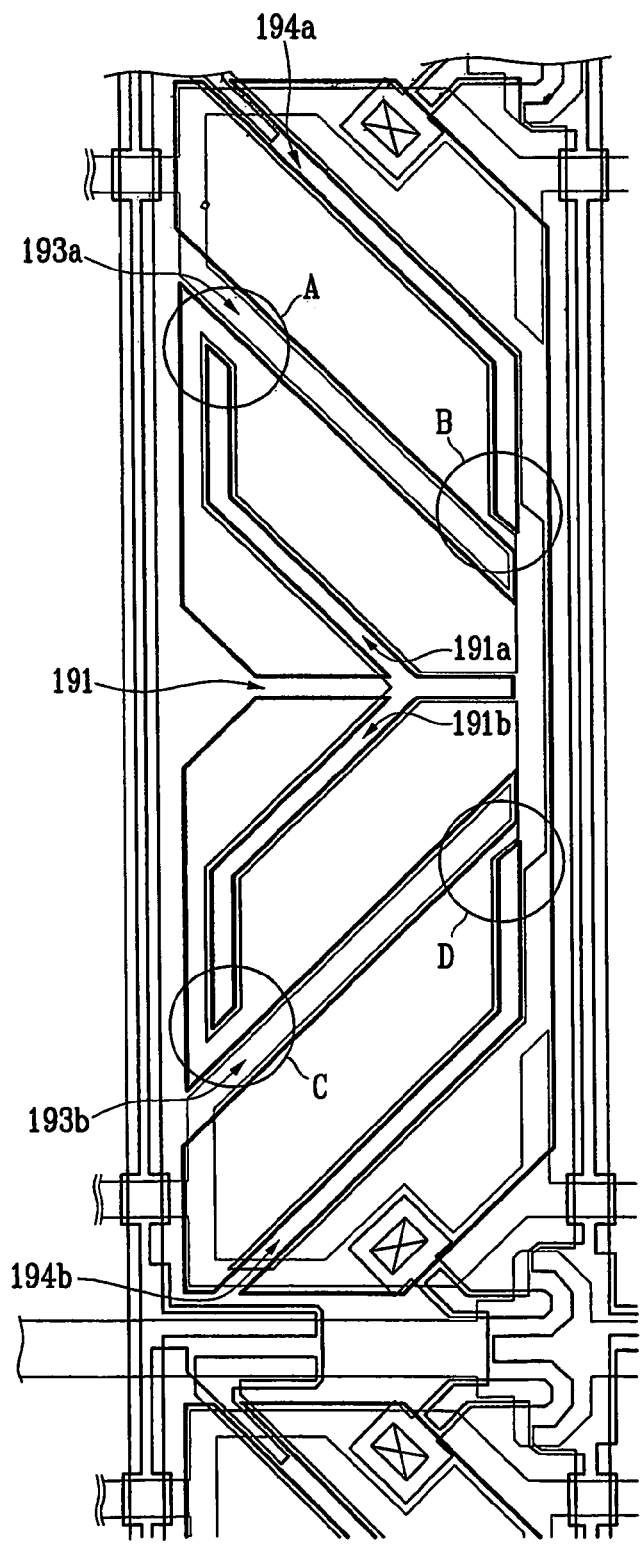

FIG. 19 is a plan view of a thin film transistor array panel for a liquid crystal display according to a fifth preferred embodiment of the present invention.

The structure related to the fifth preferred embodiment is the same as that related to the fourth preferred embodiment (as shown in FIG. 18) except that the apertures 191a, 191b, 193a and 193b are bent while being independently defining the long and the short sides of the pixel domain at the same time, and the apertures 192a, 192b, 195a and 195b are omitted. With the structure related to the fifth preferred embodiment, bridges A, B, C and D for interconnecting the respective micro portions of the pixel electrode 190 by way of the apertures 191a, 191b, 193a and 193b are formed at the left and the right sides of the pixel electrode 190. The bridges have a role of balancing the fringe fields at the left and the right of the direction control electrode 178, 178a and 178b, thereby preventing the textures occurred at the top of the direction control electrode 178, 178a and 178b from being intruded into the pixel domain.

Figure 20:
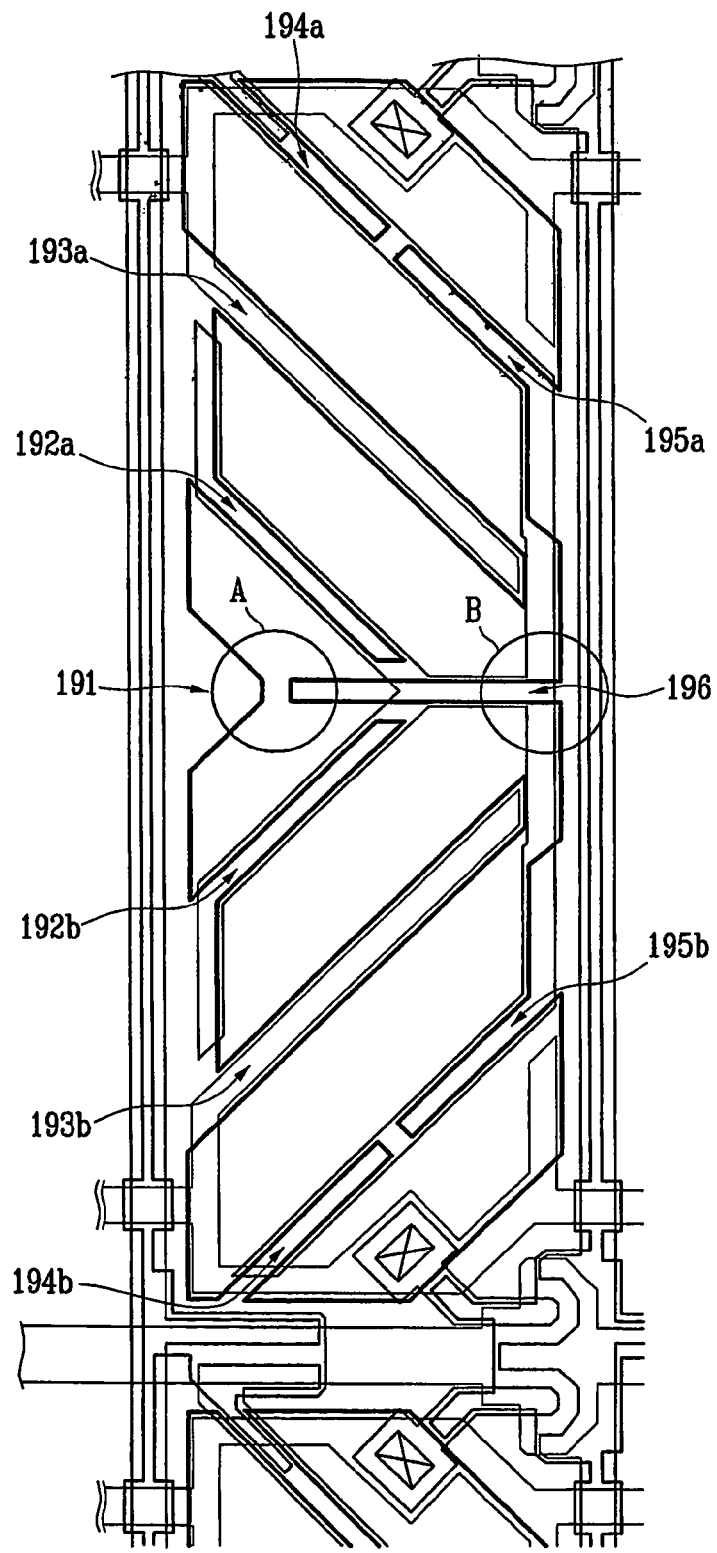

FIG. 20 is a plan view of a thin film transistor array panel for a liquid crystal display according to a sixth preferred embodiment of the present invention.

The structure related to the sixth preferred embodiment is the same as that related to the fourth preferred embodiment (as shown in FIG. 18) except that only the edge-cut portion is left as the horizontal aperture 191, and a separate horizontal aperture 196 proceeds from the right side of the pixel electrode 190 to the left side thereof. Furthermore, with this preferred embodiment, the apertures 192a and 192b are extended up to the area close to the horizontal aperture 196.

Figure 21:
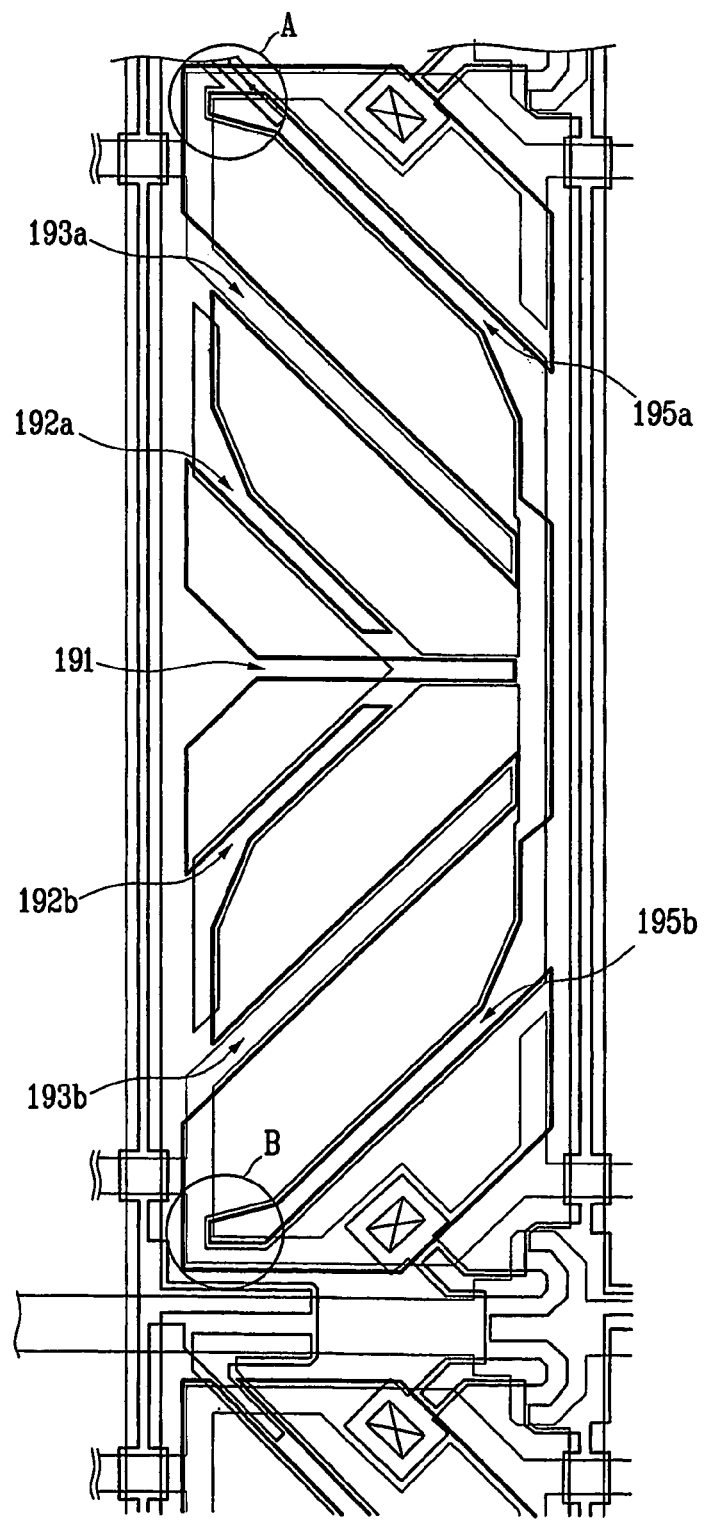

FIG. 21 is a plan view of a thin film transistor array panel for a liquid crystal display according to a seventh preferred embodiment of the present invention.

The structure related to the seventh preferred embodiment is the same as that related to the fourth preferred embodiment (as shown in FIG. 18) except that the apertures 191a, 191b, 194a and 194b are omitted, and the apertures 192a, 192b, 195a and 195b are extended up to the area close to the horizontal aperture as well as up to the area close to the left top and bottom edges of the pixel electrode 190. Furthermore, with this preferred embodiment, the inlet portion of the apertures 192a and 192b and the inlet and outlet portions of the apertures 194a and 194b are enlarged. The enlarged portion of the apertures 192a, 192b, 194a and 194b is made through cutting away the edge of the micro pixel electrode portion while slowing down the bent angle of the edge between the long and the short sides of the pixel domain. When the bent angle becomes slowed down, variation in the alignment of the liquid crystal molecules is also made slowly while reducing the textures due to the collision of the liquid crystal molecules.

Figure 22:
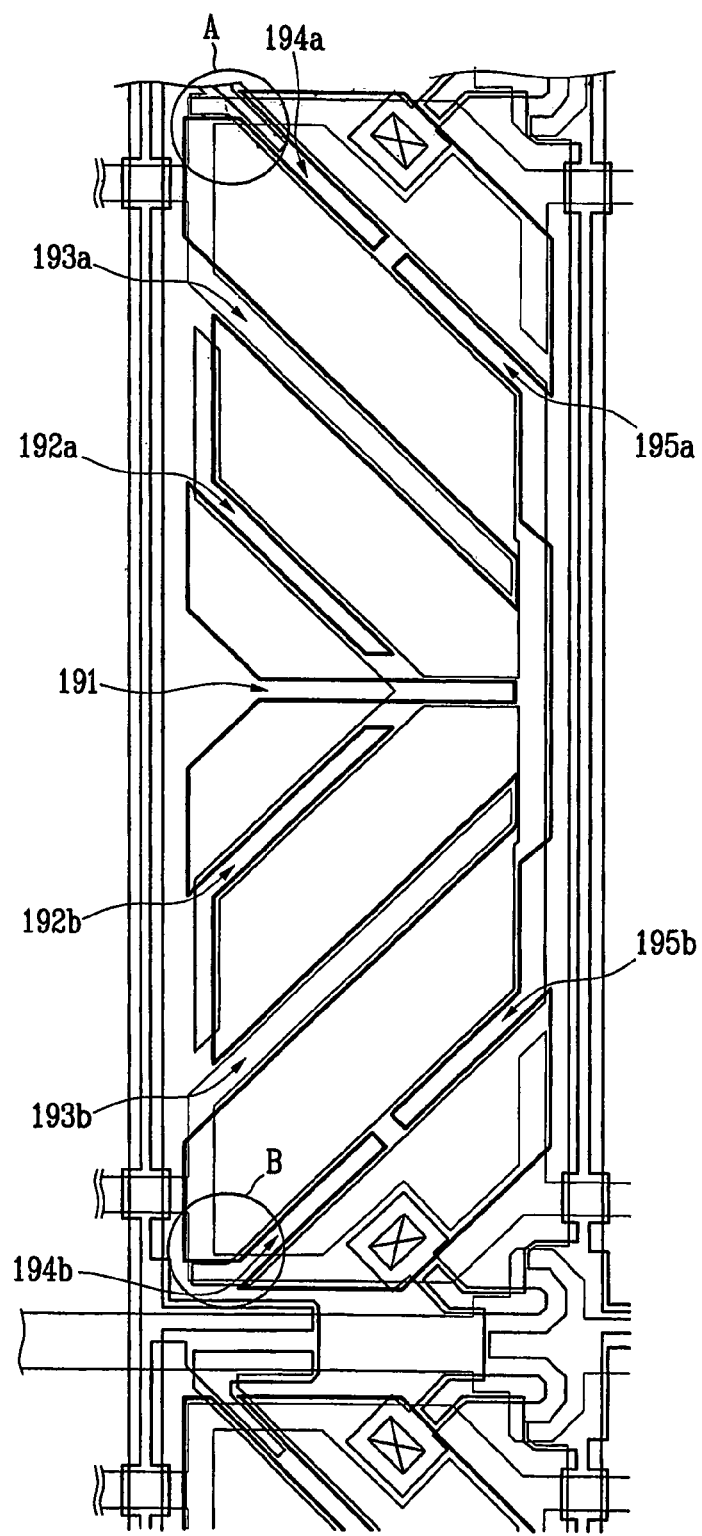

FIG. 22 is a plan view of a thin film transistor array panel for a liquid crystal display according to an eighth preferred embodiment of the present invention.

The structure related to the eighth preferred embodiment is the same as that related to the fourth preferred embodiment (as shown in FIG. 18) except that the apertures 191a and 191b are omitted, and the apertures 192a and 192b are extended up to the area close to the horizontal aperture 191. Furthermore, with this preferred embodiment, the edge of the micro pixel electrode portion at the inlet area of the apertures 194a and 194b is cut away. When the edge between the short and the long sides of the micro pixel electrode portion is cut away, the bent angle of the edge-cut area becomes slowed down while reducing the textures due to the collision of the liquid crystal molecules.

Figure 23:
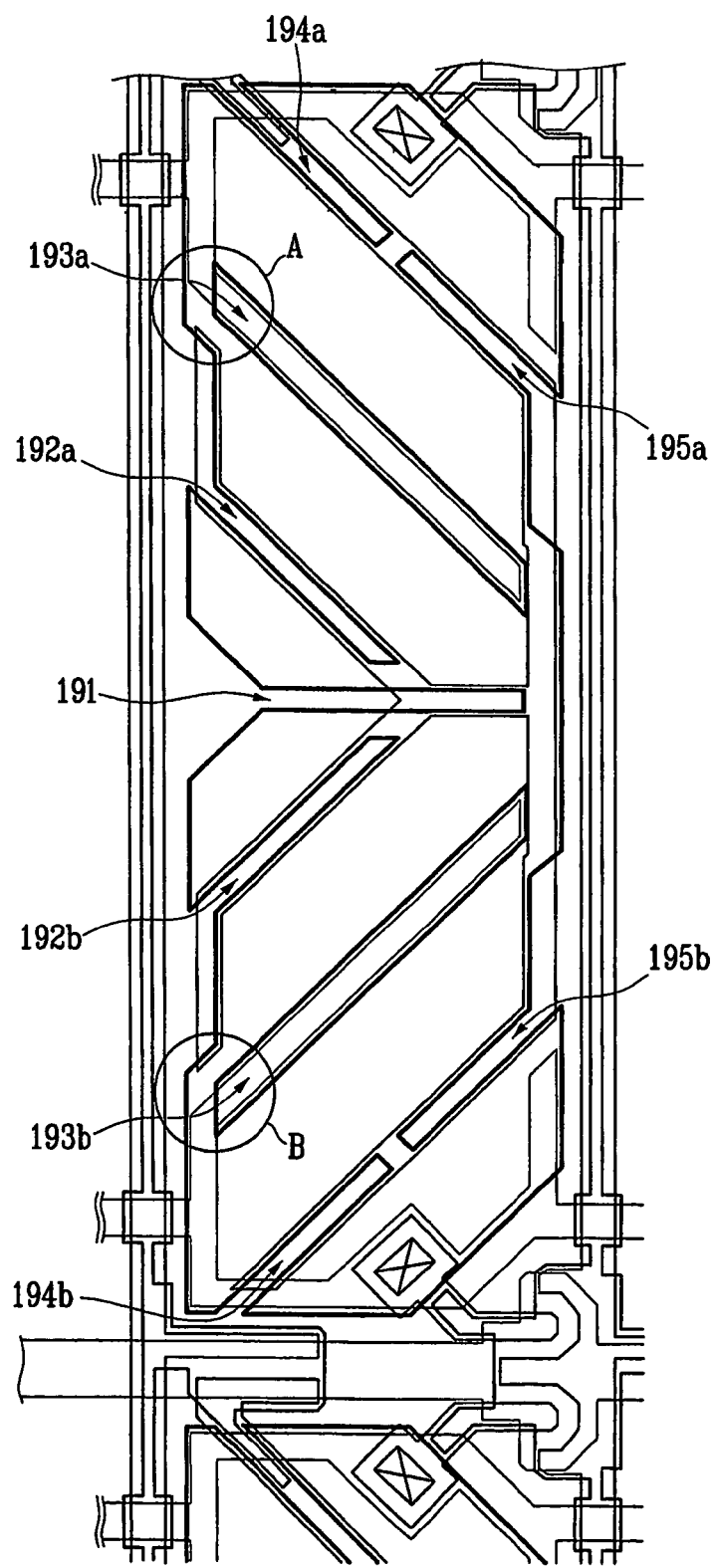

FIG. 23 is a plan view of a thin film transistor array panel for a liquid crystal display according to a ninth preferred embodiment of the present invention.

The structure related to thee ninth preferred embodiment is the same as that related to the eighth preferred embodiment (as shown in FIG. 22) in that the apertures 193a and 193b are placed within the pixel electrode 190. That is, bridges are formed at both sides of the apertures 193a and 193b.

Figure 24:
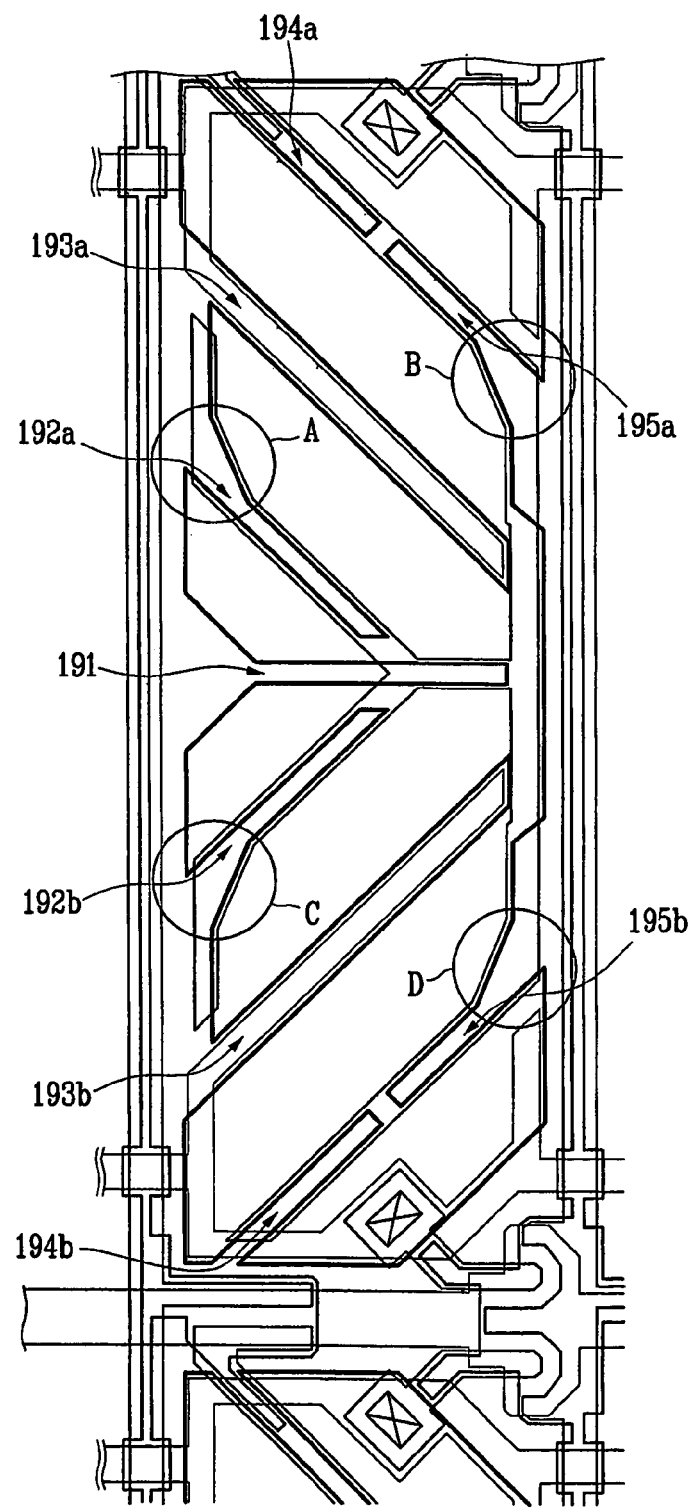

FIG. 24 is a plan view of a thin film transistor array panel for a liquid crystal display according to a tenth preferred embodiment of the present invention.

The structure related to the tenth preferred embodiment is similar to that related to the third preferred embodiment, but differs from that related to the eighth preferred embodiment (as shown in FIG. 22) in that the edge of the micro portions of the pixel electrode 190 at the inlet areas A, B, C and D of the apertures 192a, 192b, 195a and 195b is cut away. When the edge between the short and the long sides of the micro pixel electrode portion is cut away, the bent angle of the edge-cut area becomes slowed down while reducing the textures due to the collision of the liquid crystal molecules.

Figure 25:
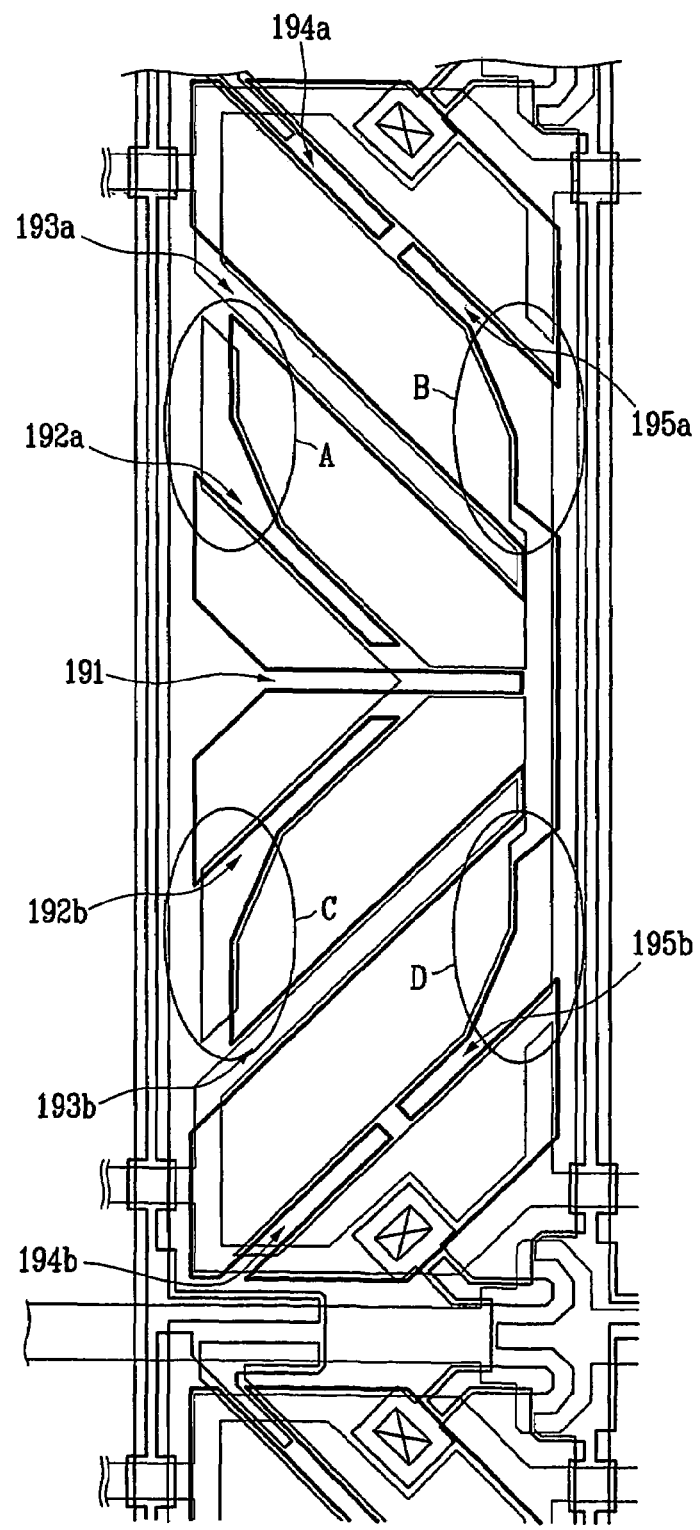

FIG. 25 is a plan view of a thin film transistor array panel for a liquid crystal display according to an eleventh preferred embodiment of the present invention.

The structure related to the eleventh preferred embodiment is the same as that related to the tenth preferred embodiment (as shown in FIG. 24) except that the direction control electrode 178, 178a and 178b surrounding the short side of the micro pixel electrode portion has a large width. When the width of the direction control electrode 178, 178a and 178b becomes enlarged, the direction control electric field becomes stronger while prohibiting occurrence of textures.

Figure 26:
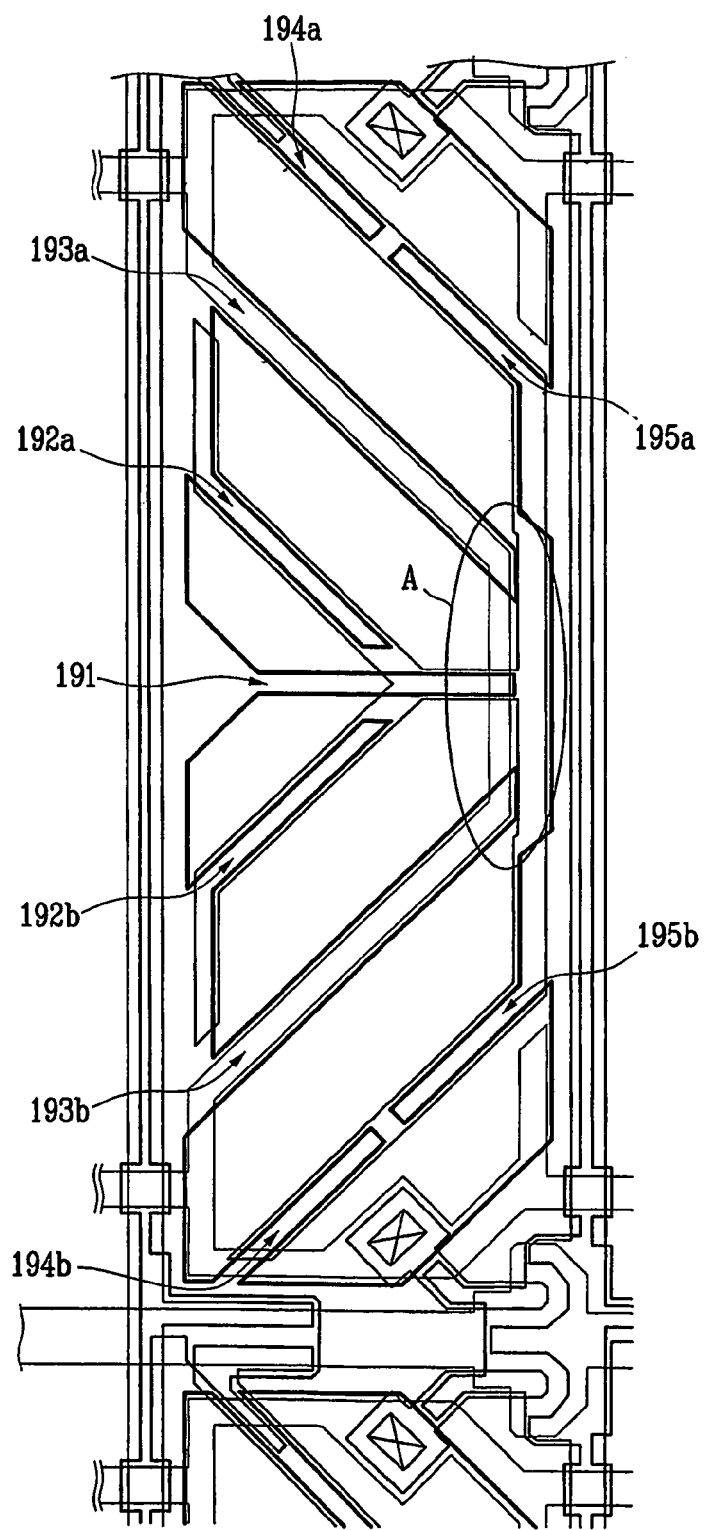

FIG. 26 is a plan view of a thin film transistor array panel for a liquid crystal display according to a twelfth preferred embodiment of the present invention.

The structure related to the twelfth preferred embodiment is the same as that related to the eighth preferred embodiment (as shown in FIG. 22) except that the storage electrodes 133a and 133b are connected to each other by way of a connector A. When the top and the bottom storage electrodes 133a and 133b are connected to each other, the resistance of the storage wire becomes reduced.

Figure 27:
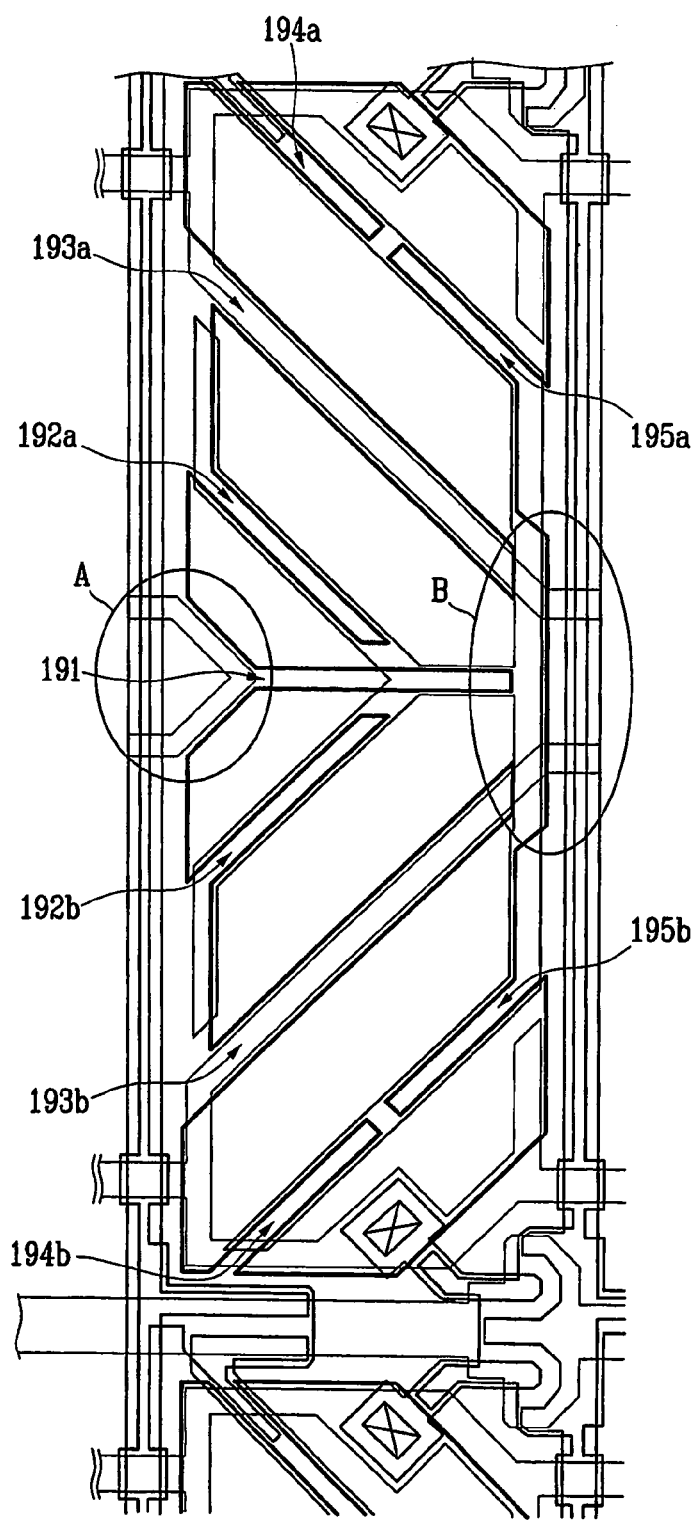

FIG. 27 is a plan view of a thin film transistor array panel for a liquid crystal display according to a thirteenth preferred embodiment of the present invention.

The structure related to the thirteenth preferred embodiment is the same as that related to the twelfth preferred embodiment (as shown in FIG. 26) except that the connector A for interconnecting the storage electrodes 133a and 133b proceeds along the inlet of the horizontal aperture 191 at the pixel neighbor. Consequently, the storage electrode and the direction control electrode are alternately arranged around all the micro portions of the pixel electrode 190, thereby improving the domain stability.

Figure 28:
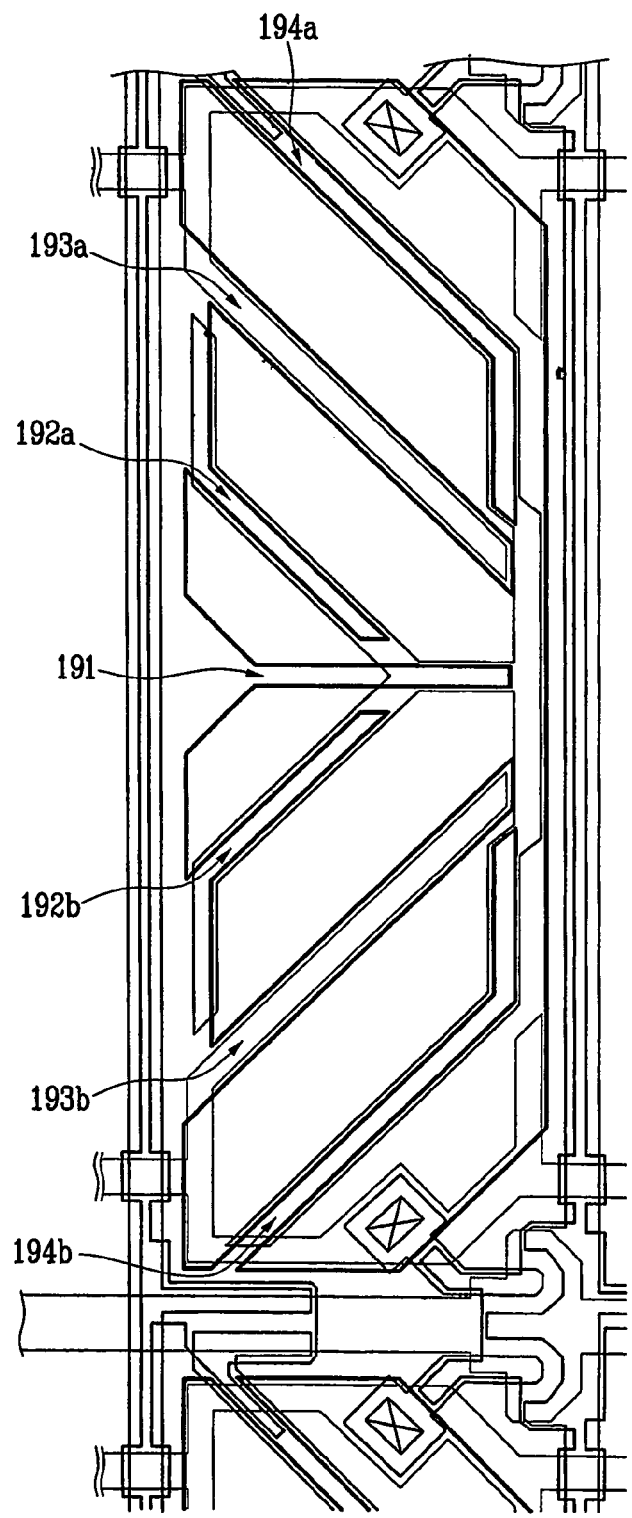

FIG. 28 is a plan view of a thin film transistor array panel for a liquid crystal display according to a fourteenth preferred embodiment of the present invention.

The structure related to the fourteenth preferred embodiment is obtained by combining that related to the fifth preferred embodiment (as shown in FIG. 19) with that related to the eighth preferred embodiment (as shown in FIG. 22). The apertures 194a and 194b are derived from those related to the fifth preferred embodiment, and the apertures 191, 192a, 192b, 193a and 193b from those related to the eighth preferred embodiment.

Figure 29:
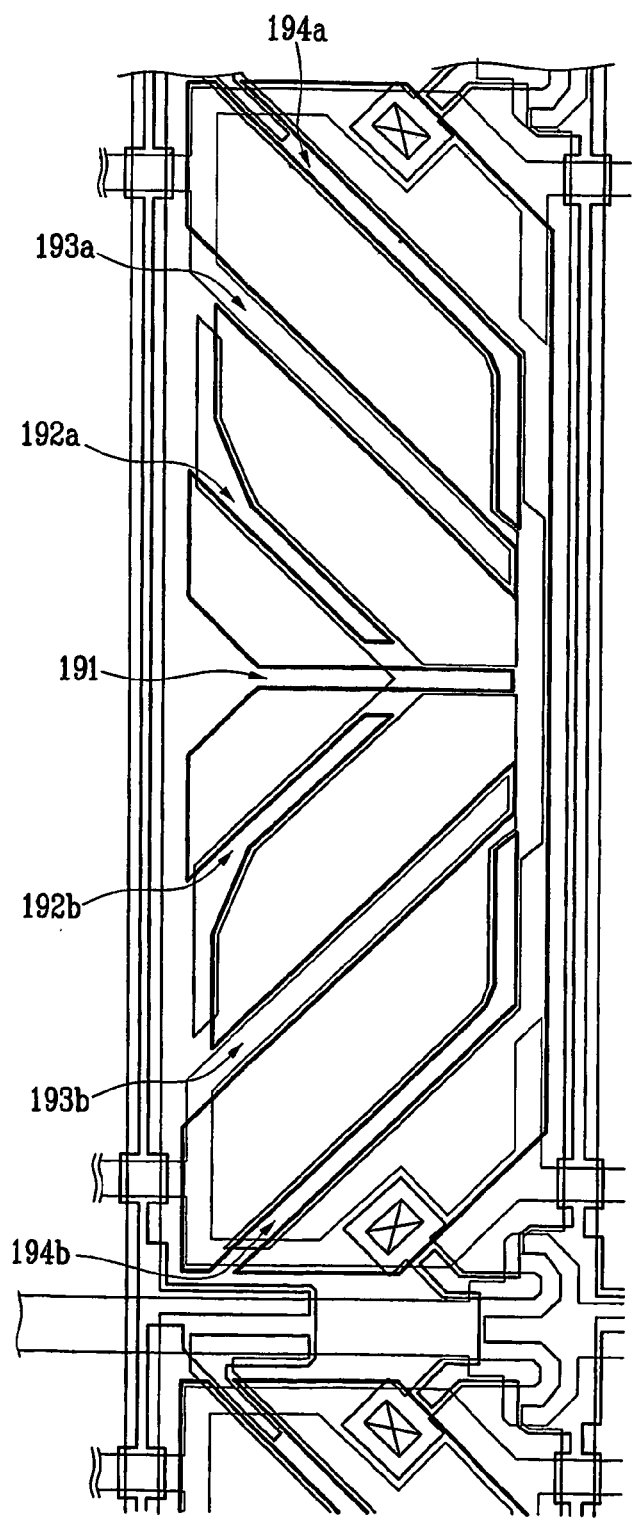

FIG. 29 is a plan view of a thin film transistor array panel for a liquid crystal display according to a fifteenth preferred embodiment of the present invention.

The structure related to the fifteenth preferred embodiment is obtained by adding the structure where the edge between the long and the short sides of the micro pixel electrode portion is cut away to that related to the fourteenth preferred embodiment (as shown in FIG. 28).

Figure 30:
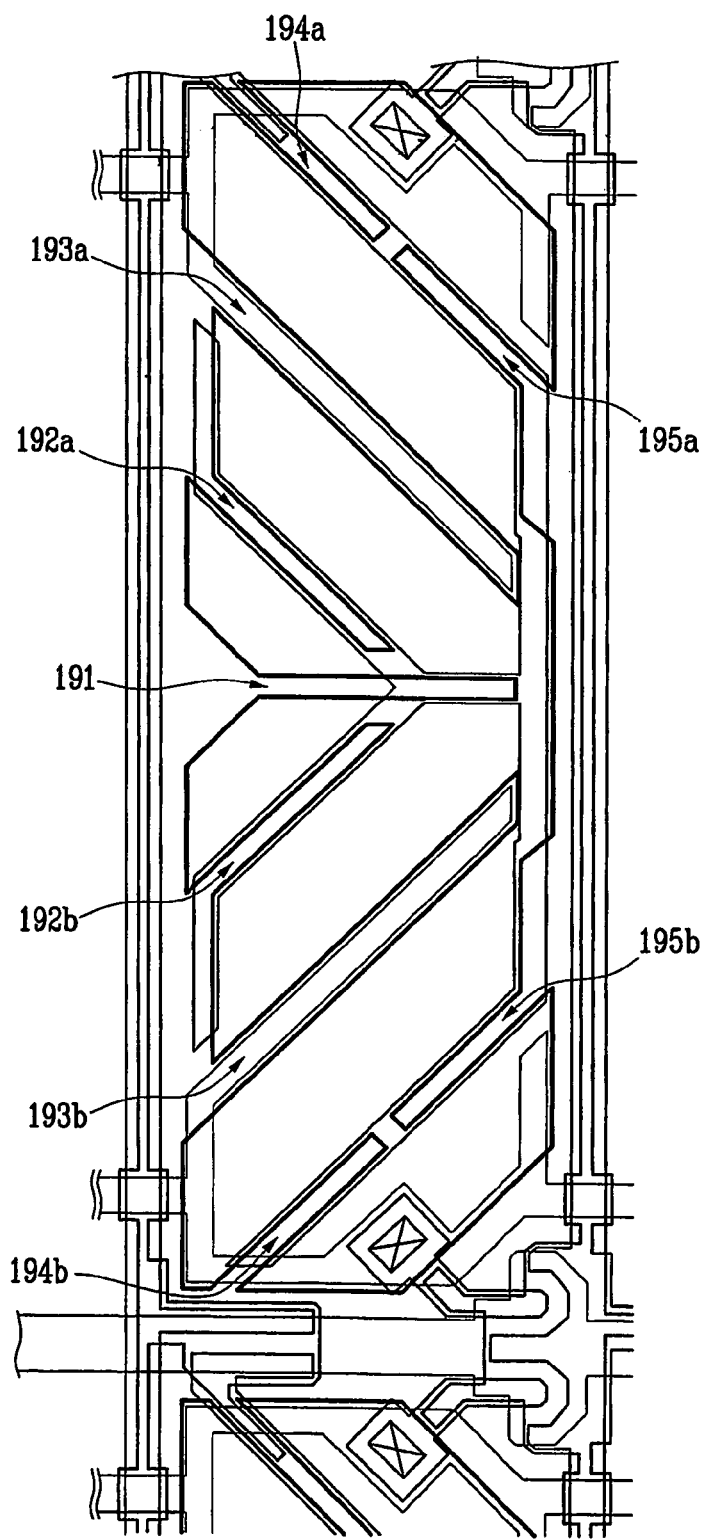

FIG. 30 is a plan view of a thin film transistor array panel for a liquid crystal display according to a sixteenth preferred embodiment of the present invention.

The structure related to the sixteenth preferred embodiment is the same as that related to the eighth preferred embodiment (as shown in FIG. 22) except that the cutting of the edge between the long and the short sides of the micro pixel electrode portion at the inlet area of the apertures 194a and 194b is omitted.

As described above, the two long sides of the pixel domain proceed parallel to each other, thereby enhancing the speed of alignment of the liquid crystal molecules and the stability thereof. The arrangement of the aperture, the direction control electrode and the storage electrode is made in an appropriate manner, thereby further enhancing the domain stability.

While the present invention has been described in detail with reference to the preferred embodiments, those skilled in the art will appreciate that various modifications and substitutions can be made thereto without departing from the spirit and scope of the present invention as set forth in the appended claims.

What is claimed is:

1. A thin film transistor array panel comprising:
    an insulating substrate;
    a plurality of first signal lines formed on the insulating substrate;
    a plurality of second signal lines formed on the insulating substrate and intersecting the first signal lines in an insulating manner;
    a pixel electrode formed in a pixel area defined by the intersections of the first signal lines and the second signal lines and including a plurality of subareas partitioned by cutouts and a plurality of bridges connecting the subareas;
    a first thin film transistor connected to the pixel electrode;
    a direction control electrode formed in the pixel area and including a portion overlapping at least one of the cutouts, and
    a second thin film transistor connected to the direction control electrode,
    wherein two long edges of each subarea are parallel to each other and the at least one of the cutouts overlapping the portion of the direction control electrode defines one of two longest edges of the subarea.

2. The thin film transistor array panel of claim 1, further comprising a third signal line intersecting the second signal lines in an insulating manner and including a portion overlapping at least another of the cutouts which is not overlapping the direction control electrode.

3. The thin film transistor array panel of claim 2, wherein the third signal line comprises a pair of portions placed between adjacent two of the first signal lines and having inversion symmetry.

4. The thin film transistor array panel of claim 3, wherein the pair of portions of the third signal line placed between the adjacent two of the first signal lines are connected to each other through a connector.

5. The thin film transistor array panel of claim 1, wherein:
the first thin film transistor connects to a relevant one of the first signal lines and a relevant one of the second signal lines,
the second thin film transistor connects to a previous one of the first signal lines and a previous one of the second signal lines, and
the thin film transistor array panel further comprises a third thin film transistor connected to the previous first signal line, the relevant second signal line, and the pixel electrode.

6. The thin film transistor array panel of claim 1, wherein at least one of the bridges are located near a center of the long edges of the subareas and the other of the bridges are located at an edge of the pixel electrode positioned close to the second signal lines.

7. The thin film transistor array panel of claim 1, wherein the bridges are located at an edge of the pixel electrode positioned close to the second signal lines.

8. The thin film transistor array panel of claim 1, wherein at least one of the subareas is chamfered.

9. The thin film transistor array panel of claim 1, wherein the cutouts comprise a transverse cutout bisecting the pixel electrode into upper and lower halves and a plurality of oblique cutouts having inversion symmetry with respect to the transverse cutout.

10. The thin film transistor array panel of claim 9, wherein the oblique cutouts comprise:
a first cutout proceeding from an edge of the pixel electrode toward another edge of the pixel electrode to define one of the bridges located between a terminal of the first cutout and the another edge of the pixel electrode;
a second cutout proceeding from an edge of the pixel electrode into the pixel electrode;
a third cutout proceeding from the transverse cutout into the pixel electrode, the second and the third cutouts running in a straight line to define one of the bridges located between the second cutout and the third cutout; and
a pair of fourth cutouts proceeding from edges of the pixel electrode into the pixel electrode and extending along a straight line to define one of the bridges located between the fourth cutouts.

11. The thin film transistor array panel of claim 9, wherein the oblique cutouts comprise:
a first cutout proceeding from an edge of the pixel electrode toward another edge of the pixel electrode to define one of the bridges located between a terminal of the first cutout and the another edge of the pixel electrode; and
a second cutout curved to define both a long edge and a short edge of one of the subareas.

12. The thin film transistor array panel of claim 9, wherein the oblique cutouts comprise:
a first cutout proceeding from an edge of the pixel electrode toward another edge of the pixel electrode to define one of the bridges located between a terminal of the first cutout and the another edge of the pixel electrode;
a second cutout proceeding from an edge of the pixel electrode toward the transverse cutout to define one of the bridges located between the transverse cutout and a terminal of the second cutout; and
a pair of third cutouts proceeding from edges of the pixel electrode into the pixel electrode and extending along a straight line to define one of the bridges located between the third cutouts.

13. The thin film transistor array panel of claim 12, wherein the second and the third cutouts have inlets wider than the terminals of the second and the third cutouts.

14. The thin film transistor array panel of claim 9, wherein the oblique cutouts comprise:
a first cutout proceeding from an edge of the pixel electrode toward another edge of the pixel electrode to define one of the bridges located between a terminal of the first cutout and the another edge of the pixel electrode;
a second cutout proceeding from an edge of the pixel electrode toward the transverse cutout to define one of the bridges located between the transverse cutout and a terminal of the second cutout; and
a third cutout curved to define both a long edge and a short edge of one of the subareas.

* * * * *